United States Patent
Connell et al.

(10) Patent No.: US 10,589,598 B2
(45) Date of Patent: Mar. 17, 2020

(54) INTEGRATED CONDENSER AND COMPRESSOR SYSTEM

(71) Applicant: Bergstrom, Inc., Rockford, IL (US)

(72) Inventors: Brett S. Connell, Winnebago, IL (US); Terry Zeigler, Byron, IL (US)

(73) Assignee: BERGSTROM, INC., Rockford, IL (US)

( * ) Notice: Subject to any disclaimer, the term of this patent is extended or adjusted under 35 U.S.C. 154(b) by 306 days.

(21) Appl. No.: 15/065,745

(22) Filed: Mar. 9, 2016

(65) Prior Publication Data

US 2017/0259645 A1 Sep. 14, 2017

(51) Int. Cl.
*F25B 27/00* (2006.01)
*B60H 1/00* (2006.01)
(Continued)

(52) U.S. Cl.
CPC ....... *B60H 1/00885* (2013.01); *B60H 1/0045* (2013.01); *B60H 1/00428* (2013.01);
(Continued)

(58) Field of Classification Search
CPC .......... B60H 1/00885; B60H 1/3229; B60H 1/3227; B60H 1/0045; B60H 1/00899;
(Continued)

(56) References Cited

U.S. PATENT DOCUMENTS

| | | |
|---|---|---|
| 2,722,050 A | 11/1955 | Shank |
| 2,789,234 A | 6/1956 | Lambert et al. |

(Continued)

FOREIGN PATENT DOCUMENTS

| | | |
|---|---|---|
| CN | 1468409 A | 1/2004 |
| CN | 2883071 Y | 3/2007 |

(Continued)

OTHER PUBLICATIONS

Alfa Laval Website http://www.alfalaval.com/ecore-Java/WebObjects/ecoreJava.woa/wa/shoNode?siteNodelID=1668&cont . . . ; date last visited May 18, 2007; 1 page.

(Continued)

*Primary Examiner* — Henry T Crenshaw
*Assistant Examiner* — Kamran Tavakoldavani
(74) *Attorney, Agent, or Firm* — Morgan, Lewis & Bockius LLP

(57) ABSTRACT

Disclosed is an integrated compressor system configured to be integrated with existing air conditioning systems. The integrated compressor system generally includes a mounting assembly, a first compressor and a valve. The mounting assembly can be mounted directly on a condenser of an existing air conditioning system. The first compressor and the valve are mounted directly on the mounting assembly. The valve has a first valve inlet, a second valve inlet and a valve outlet. When assembly and integrated with an existing AC system, the first valve inlet is fluidly coupled to a compressor outlet of the first compressor, the second valve inlet is fluidly coupled to a compressor outlet of the compressor of existing AC system, and a valve outlet is fluidly connected to a condenser inlet of the condenser.

18 Claims, 24 Drawing Sheets

(51) Int. Cl.
*F28F 9/00* (2006.01)
*B60H 1/32* (2006.01)
*F25B 31/00* (2006.01)
*F25B 39/00* (2006.01)
*F25B 49/02* (2006.01)
*F25B 39/04* (2006.01)

(52) U.S. Cl.
CPC ......... *B60H 1/3223* (2013.01); *B60H 1/3227* (2013.01); *B60H 1/3229* (2013.01); *F25B 31/00* (2013.01); *F25B 39/00* (2013.01); *F25B 49/02* (2013.01); *F28F 9/002* (2013.01); *F25B 39/04* (2013.01); *F25B 2400/071* (2013.01); *F25B 2400/075* (2013.01)

(58) Field of Classification Search
CPC ................ B60H 1/3223; B60H 1/3226; B60H 2001/3294; F25B 31/00; F25B 2400/075; F25B 2339/044; F25B 2400/071; F25B 39/04; F25B 39/00; F25B 2400/0751
See application file for complete search history.

(56) References Cited

U.S. PATENT DOCUMENTS

| | | |
|---|---|---|
| 3,176,502 A | 4/1965 | Cizek et al. |
| 3,225,819 A | 12/1965 | Stevens |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,880,224 A | 4/1975 | Weil |
| 3,885,398 A | 5/1975 | Dawkins |
| 3,938,349 A | 2/1976 | Ueno |
| 3,948,060 A | 4/1976 | Gaspard |
| 3,995,443 A | 12/1976 | Iversen |
| 4,015,182 A | 3/1977 | Erdman |
| 4,034,801 A | 7/1977 | Bermstein |
| 4,071,080 A | 1/1978 | Bridgers |
| 4,217,764 A | 8/1980 | Armbruster |
| 4,266,405 A | 5/1981 | Trask |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,391,321 A | 7/1983 | Thunberg |
| 4,412,425 A | 11/1983 | Fukami |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,905,478 A | 3/1990 | Matsuda et al. |
| 4,945,977 A | 8/1990 | D'Agaro |
| 4,947,657 A | 8/1990 | Kalmbach |
| 4,952,283 A | 8/1990 | Besik |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,205,781 A | 4/1993 | Kanno |
| 5,230,719 A | 7/1993 | Berner et al. |
| 5,275,012 A | 1/1994 | Dage et al. |
| 5,307,645 A | 5/1994 | Pannell |
| 5,316,074 A | 5/1994 | Isaji et al. |
| 5,324,229 A | 6/1994 | Weisbecker |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westermeyer |
| 5,426,953 A | 6/1995 | Meckler |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergmen, Jr. et al. |
| 5,528,901 A | 6/1996 | Willis |
| 5,562,538 A | 10/1996 | Suyama |
| 5,586,613 A | 12/1996 | Ehsani |
| 5,647,534 A | 7/1997 | Kelz et al. |
| 5,657,638 A | 8/1997 | Erdman et al. |
| 5,682,757 A | 11/1997 | Peterson |
| 5,720,181 A | 2/1998 | Karl et al. |
| 5,752,391 A | 5/1998 | Ozaki et al. |
| 5,761,918 A | 6/1998 | Jackson et al. |
| 5,775,415 A | 7/1998 | Yoshini |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Magakawa et al. |
| 5,982,643 A | 11/1999 | Phlipot |
| 5,996,363 A | 12/1999 | Kurachi et al. |
| 6,016,662 A | 1/2000 | Tanaka et al. |
| 6,021,043 A | 2/2000 | Horng |
| 6,028,406 A | 2/2000 | Birk |
| 6,029,465 A | 2/2000 | Bascobert |
| 6,038,877 A | 3/2000 | Peiffer et al. |
| 6,038,879 A | 3/2000 | Turcotte |
| 6,059,016 A | 5/2000 | Rafalovich et al. |
| 6,072,261 A | 6/2000 | Lin |
| 6,073,456 A | 6/2000 | Kawai et al. |
| 6,111,731 A | 8/2000 | Cepynsky |
| 6,112,535 A | 9/2000 | Hollenbeck |
| 6,125,642 A | 10/2000 | Seener et al. |
| 6,134,901 A | 10/2000 | Harvest et al. |
| 6,152,217 A | 11/2000 | Ito et al. |
| 6,185,959 B1 * | 2/2001 | Zajac .................. B60H 1/3229 62/527 |
| 6,193,475 B1 * | 2/2001 | Rozek ..................... F04B 35/04 417/360 |
| 6,205,795 B1 | 3/2001 | Backman et al. |
| 6,205,802 B1 | 3/2001 | Drucker et al. |
| 6,209,333 B1 | 4/2001 | Bascobert |
| 6,209,622 B1 | 4/2001 | Lagace et al. |
| 6,213,867 B1 | 4/2001 | Yazici |
| 6,230,507 B1 | 5/2001 | Ban et al. |
| 6,232,687 B1 | 5/2001 | Hollenbeck et al. |
| 6,253,563 B1 | 7/2001 | Ewert et al. |
| 6,265,692 B1 | 7/2001 | Umebayahi et al. |
| 6,276,161 B1 | 8/2001 | Peiffer et al. |
| 6,282,919 B1 | 9/2001 | Rockenfeller et al. |
| 6,318,103 B1 | 11/2001 | Rieger et al. |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |
| 6,467,279 B1 | 10/2002 | Backman et al. |
| 6,474,081 B1 | 11/2002 | Feuerecker |
| 6,530,426 B1 | 3/2003 | Kishita et al. |
| 6,543,245 B1 | 4/2003 | Waldschmidt |
| 6,571,566 B1 | 6/2003 | Temple et al. |
| 6,575,228 B1 | 6/2003 | Ragland et al. |
| 6,626,003 B1 | 9/2003 | Kortüm et al. |

(56) References Cited

U.S. PATENT DOCUMENTS

| | | |
|---|---|---|
| 6,675,601 B2 | 1/2004 | Ebara |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 6,992,419 B2 | 1/2006 | Kim et al. |
| 7,131,281 B2 | 11/2006 | Salim et al. |
| 7,135,799 B2 | 11/2006 | Rittmeyer |
| 7,150,159 B1 | 12/2006 | Brummett et al. |
| 7,246,502 B2 | 7/2007 | Hammonds et al. |
| 7,316,119 B2 | 1/2008 | Allen |
| 7,350,368 B2 | 4/2008 | Heberle et al. |
| 7,385,323 B2 | 6/2008 | Takahashi et al. |
| 7,591,143 B2 | 9/2009 | Zeigler et al. |
| 7,591,303 B2 | 9/2009 | Ziegler et al. |
| 7,614,242 B1 | 11/2009 | Quesada Saborio |
| 7,637,031 B2 | 12/2009 | Salim et al. |
| 7,765,824 B2 | 8/2010 | Wong et al. |
| 7,821,175 B2 | 10/2010 | Ionel et al. |
| 7,932,658 B2 | 4/2011 | Ionel |
| 8,001,799 B2 | 8/2011 | Obayashi et al. |
| 8,141,377 B2 * | 3/2012 | Connell ............ B60H 1/00378 62/239 |
| 8,156,754 B2 | 4/2012 | Hong et al. |
| 8,276,892 B2 | 10/2012 | Narikawa et al. |
| 8,492,948 B2 | 7/2013 | Wang et al. |
| 8,517,087 B2 | 8/2013 | Zeigler et al. |
| 8,821,092 B2 * | 9/2014 | Nambara ................ F16B 39/00 411/166 |
| 8,841,813 B2 | 9/2014 | Junak et al. |
| 8,905,071 B2 * | 12/2014 | Coombs .............. F15B 13/0814 137/596 |
| 8,919,140 B2 | 12/2014 | Johnson et al. |
| 8,947,531 B2 | 2/2015 | Fischer et al. |
| 9,157,670 B2 | 10/2015 | Kreeley et al. |
| 9,216,628 B2 | 12/2015 | Self et al. |
| 9,221,409 B1 | 12/2015 | Gauthier |
| 9,783,024 B2 | 10/2017 | Connell et al. |
| 9,878,591 B2 | 1/2018 | Taniguchi et al. |
| 2001/0010261 A1 | 8/2001 | Oomura et al. |
| 2002/0020183 A1 * | 2/2002 | Hayashi ............... B60H 1/3229 62/298 |
| 2002/0026801 A1 | 3/2002 | Yamashita |
| 2002/0036081 A1 | 3/2002 | Ito et al. |
| 2002/0042248 A1 | 4/2002 | Vincent et al. |
| 2002/0078700 A1 | 6/2002 | Kelm et al. |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0079098 A1 | 4/2004 | Uno et al. |
| 2004/0112074 A1 | 6/2004 | Komura et al. |
| 2004/0168449 A1 | 9/2004 | Homan et al. |
| 2004/0216477 A1 | 11/2004 | Yamasaki et al. |
| 2004/0221599 A1 | 11/2004 | Hille et al. |
| 2004/0250560 A1 | 12/2004 | Ikura |
| 2004/0256082 A1 * | 12/2004 | Bracciano .......... B60H 1/00392 165/42 |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0235660 A1 | 10/2005 | Pham |
| 2005/0257545 A1 | 11/2005 | Ziehr et al. |
| 2006/0042284 A1 | 3/2006 | Heberle et al. |
| 2006/0080980 A1 * | 4/2006 | Lee ...................... F25B 49/022 62/157 |
| 2006/0102333 A1 | 5/2006 | Zeigler et al. |
| 2006/0118290 A1 | 6/2006 | Klassen et al. |
| 2006/0151163 A1 | 7/2006 | Zeigler et al. |
| 2006/0151164 A1 | 7/2006 | Zeigler et al. |
| 2006/0254309 A1 | 11/2006 | Takeuchi et al. |
| 2007/0070605 A1 | 3/2007 | Straznicky et al. |
| 2007/0101760 A1 | 5/2007 | Bergander |
| 2007/0103014 A1 | 5/2007 | Sumiya et al. |
| 2007/0131408 A1 | 6/2007 | Zeigler et al. |
| 2007/0144723 A1 | 6/2007 | Aubertin et al. |
| 2007/0144728 A1 | 6/2007 | Kinmartin et al. |
| 2007/0163276 A1 | 7/2007 | Braun et al. |
| 2007/0227167 A1 | 10/2007 | Shapiro |
| 2007/0295017 A1 * | 12/2007 | Pannell ............. B60H 1/00364 62/236 |
| 2008/0017347 A1 | 1/2008 | Chung et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2008/0209924 A1 | 9/2008 | Yoon et al. |
| 2009/0140590 A1 | 6/2009 | Hung |
| 2009/0211280 A1 | 8/2009 | Alston |
| 2009/0229288 A1 | 9/2009 | Alston et al. |
| 2009/0241592 A1 | 10/2009 | Stover |
| 2009/0249802 A1 | 10/2009 | Nemesh et al. |
| 2009/0301702 A1 | 12/2009 | Zeigler et al. |
| 2010/0009620 A1 | 1/2010 | Kawato et al. |
| 2010/0019047 A1 | 1/2010 | Flick |
| 2010/0127591 A1 | 5/2010 | Court et al. |
| 2010/0218530 A1 | 9/2010 | Melbostad et al. |
| 2010/0263395 A1 | 10/2010 | Adachi et al. |
| 2010/0293966 A1 * | 11/2010 | Yokomachi ........ B60H 1/00478 62/3.2 |
| 2011/0088417 A1 | 4/2011 | Kayser |
| 2011/0120146 A1 | 5/2011 | Ota et al. |
| 2011/0126566 A1 * | 6/2011 | Jones ................. B60H 1/00571 62/239 |
| 2011/0174014 A1 | 7/2011 | Scarcella et al. |
| 2011/0308265 A1 | 12/2011 | Phannavong |
| 2012/0023982 A1 * | 2/2012 | Berson .................. F24F 5/0046 62/115 |
| 2012/0102779 A1 | 5/2012 | Beers et al. |
| 2012/0118532 A1 | 5/2012 | Jentzsch et al. |
| 2012/0133176 A1 | 5/2012 | Ramberg |
| 2012/0247135 A1 | 10/2012 | Fakieh |
| 2012/0297805 A1 | 11/2012 | Kamada et al. |
| 2012/0318014 A1 | 12/2012 | Huff et al. |
| 2013/0040549 A1 | 2/2013 | Douglas et al. |
| 2013/0167577 A1 | 7/2013 | Street |
| 2013/0181556 A1 | 7/2013 | Li et al. |
| 2013/0319630 A1 | 12/2013 | Yamamoto |
| 2014/0066572 A1 | 3/2014 | Corveleyn |
| 2014/0075973 A1 | 3/2014 | Graaf et al. |
| 2014/0102679 A1 * | 4/2014 | Matsudaira ............ B60K 11/04 165/143 |
| 2014/0241926 A1 | 8/2014 | Fraser |
| 2014/0260358 A1 | 9/2014 | Leete et al. |
| 2014/0290299 A1 | 10/2014 | Nakaya |
| 2015/0059367 A1 | 3/2015 | Emo et al. |
| 2015/0158368 A1 | 6/2015 | Herr-Rathke et al. |
| 2015/0210287 A1 | 7/2015 | Penilla et al. |
| 2015/0236525 A1 | 8/2015 | Aridome |
| 2015/0239365 A1 | 8/2015 | Hyde et al. |
| 2015/0306937 A1 | 10/2015 | Kitamura et al. |
| 2016/0089958 A1 * | 3/2016 | Powell ................. B60H 1/3232 62/236 |
| 2016/0144685 A1 | 5/2016 | Ochiai et al. |
| 2016/0146554 A1 * | 5/2016 | Bhatia ................ F16K 11/0716 165/100 |
| 2016/0229266 A1 | 8/2016 | Maeda et al. |

(56) References Cited

U.S. PATENT DOCUMENTS

| | | | |
|---|---|---|---|
| 2017/0211855 A1 | 7/2017 | Fraser et al. | |
| 2017/0350632 A1* | 12/2017 | Hirao | F25B 45/00 |

FOREIGN PATENT DOCUMENTS

| | | |
|---|---|---|
| CN | 201872573 U | 6/2011 |
| CN | 102398496 A | 4/2012 |
| CN | 103547466 A | 1/2014 |
| CN | 104105610 A | 10/2014 |
| CN | 105071563 A | 11/2015 |
| CN | 105186726 A | 11/2015 |
| DE | 4440044 A1 | 5/1996 |
| DE | 197 45 028 A1 | 4/1999 |
| DE | 10014483 A1 | 11/2000 |
| DE | 199 42 029 A | 3/2001 |
| DE | 199 54 308 A1 | 7/2001 |
| DE | 102005004950 A1 | 8/2006 |
| DE | 10 2007 028851 A1 | 12/2008 |
| DE | 102010054965 A1 | 6/2012 |
| DE | 10 2012 022564 A1 | 5/2014 |
| DE | 11 2015 00055 | 11/2016 |
| EP | 0516413 A1 | 12/1992 |
| EP | 0958952 A1 | 11/1999 |
| EP | 1024038 A2 | 8/2000 |
| EP | 1 400 764 A1 | 3/2004 |
| EP | 1 477 748 A1 | 11/2004 |
| EP | 1 700 725 A1 | 9/2006 |
| EP | 1 703 231 A1 | 9/2006 |
| EP | 1 970 651 A1 | 9/2008 |
| EP | 2048011 A1 | 4/2009 |
| EP | 2196748 A2 | 6/2010 |
| EP | 2320160 A1 | 11/2011 |
| EP | 2894420 A1 | 7/2015 |
| EP | 0963895 A2 | 12/2015 |
| EP | 3118035 A1 | 1/2017 |
| FR | 2966391 A1 | 4/2012 |
| JP | H02-128915 A | 5/1990 |
| JP | 5032121 A | 2/1993 |
| JP | H07186711 A | 7/1995 |
| JP | H97-76740 A | 3/1997 |
| JP | H09318177 A | 12/1997 |
| JP | H10281595 A | 10/1998 |
| JP | 2000108651 A | 4/2000 |
| JP | 2005044551 A | 4/2000 |
| JP | 2002081823 A | 3/2002 |
| JP | 2005-033941 A | 2/2005 |
| JP | 2005-081960 A | 3/2005 |
| JP | 2006-264568 A | 10/2006 |
| JP | 2008220043 A | 9/2008 |
| JP | 2012017029 A | 1/2012 |
| JP | 2014226979 A | 12/2014 |
| KR | 20090068136 A | 6/2009 |
| WO | WO 89/09143 A1 | 10/1989 |
| WO | WO 99/61269 | 12/1999 |
| WO | WO 00/00361 | 1/2000 |
| WO | WO 2004/011288 A1 | 2/2004 |
| WO | WO 2006/082082 A1 | 8/2006 |
| WO | WO 2012/158326 A1 | 11/2012 |
| WO | WO 2013/113308 A1 | 8/2013 |
| WO | WO 2014/112320 A1 | 7/2014 |
| WO | WO 2014/180749 A1 | 11/2014 |
| WO | WO 2014/209780 A1 | 12/2014 |
| WO | WO 2015/076872 A1 | 5/2015 |

OTHER PUBLICATIONS

Anonymous: "NITE Connected Climate Controlled Transport Monitoring/Mobile Internet of Things UI Design/Mobil UI: Progress/Printeres/Internet of Things, User Inter . . . ," Oct. 19, 2016 retrieved from: URL:htps://za.pinterest.com/pin/192810427773981541/, 1 pg.
Bergstrom, Inc., International Search Report and Written Opinion, PCT/US2014/026687, dated Jul. 28, 2014, 12 pgs.
Bergstrom, Inc., International Preliminary Report on Patentability, PCT/US2014/026687, dated Sep. 15, 2015, 7 pgs.
Bergstrom, Inc., International Search Report and Written Opinion, PCT/US2014/026683, dated Jul. 3, 2014 12 pgs.
Bergstrom, Inc., International Preliminary Report on Patentability, PCT/US2014/026683, dated Sep. 15, 2015, 6 pgs.
Bergstrom, Inc., International Search Report and Written Opinion, PCT/US2013/068331, dated Nov. 7, 2014, 9 pgs.
Bergstrom, Inc., International Preliminary Report on Patentability, PCT/US2013/068331, dated May 10, 2016, 6 pgs.
Bergstrom, Inc., International Search Report and Written Opinion, PCT/US2016/021602, dated Nov. 3, 2016, 7 pgs.
Bergstrom, Inc., International Preliminary Report on Patentability, PCT/US2016/021602, dated Sep. 12, 2017, 11 pgs.
Bergstrom, Inc., International Search Report and Written Opinion, PCT/US2017/021346, dated Jul. 25, 2017, 11 pgs.
Bergstrom, Inc., Communication Pursuant to Rules 161(2) and 162 EPC, EP14717604.4, dated Oct. 23, 2015, 2 pgs.
Bergstrom, Inc., Communication Pursuant to Article 94(3), EP14717604.4, dated Jun. 2, 2017, 12 pgs.
Bergstrom, Inc., Communication Pursuant to Rules 161(2) and 162 EPC, EP14722438.0, dated Nov. 2, 2015. 2 pgs.
Bergstrom, Inc. Communication Pursuant to Article 94(3), EP14722438.0, dated Jan. 24, 2018, 5 pgs.
Bergstrom, Inc., Communication Pursuant to Rules 161(2) and 162 EPC, EP13795064.8, dated Jun. 22, 2016, 2 pgs.
Bergstrom, Inc. Extended European Search Report, EP16204254.3, dated Jul. 25, 2017, 8 pgs.
Bergstrom, Inc. Partial European Search Report, EP16204259.2, dated May 30, 2017, 14 pgs.
Bergstrom, Inc. Extended European Search Report, EP16204259.2, dated Oct. 25, 2017, 15 pgs.
Bergstrom, Inc. Corrected Extended European Search Report, EP16204259.2, dated Nov. 24, 2017, 15 pgs.
Bergstrom, Inc. Partial European Search Report, EP16204256.8, dated Jul. 13, 2017, 14 pgs.
Bergstrom, Inc. Extended European Search Report, EP16204256.8, dated Jan. 12, 2018, 11 pgs.
Bergstrom, Inc. Extended European Search Report, EP16204256.8, dated Dec. 1, 2017, 13 pgs.
Bergstrom, Inc., Office Action, CN201480027137.4, 15 pgs.
Bergstrom, Inc., 2nd Office Action, CN201480027137.4, dated Jul. 13, 2017, 10 pgs.
Bergstrom, Inc., 3rd Office Action, CN201480027137.4, dated Jan. 17, 2018, 19 pgs.
Bergstrom, Inc., Office Action, CN201480027117.7, 8 pgs.
Bergstrom, Inc., Patent Certificate, CN201480027117.7, dated Nov. 21, 2017, 3 pgs.
Bergstrom, Inc., 2nd Office Action, CN201380081940.1, dated Jan. 17, 2018, 13 pgs.
Connell, Office Action, U.S. Appl. No. 14/209,877, dated Nov. 27, 2015, 19 pgs.
Connell, Final Office Action, U.S. Appl. No. 14/209,877, dated Jun. 22, 2016, 17 pgs.
Connell, Final Office Action, U.S. Appl. No. 14/209,877, dated Dec. 29, 2016, 21 pgs.
Connell, Notice of Allowance, U.S. Appl. No. 14/209,877, dated May 16, 2017, 5 pgs.
Connell, Notice of Allowance, U.S. Appl. No. 14/209,877, dated Aug. 4, 2017, 7 pgs.
Connell, Office Action, U.S. Appl. No. 14/209,961, dated Dec. 2, 2015, 14 pgs.
Connell, Final Office Action, U.S. Appl. No. 14/209,961, dated Jul. 25, 2016, 15 pgs.
Connell, Notice of Allowance, U.S. Appl. No. 14/209,961, dated Jun. 15, 2017, 10 pgs.
Connell, Notice of Allowance, U.S. Appl. No. 15/064,552, dated Jun. 1, 2017, 9 pgs.
Connell, Notice of Allowance, U.S. Appl. No. 14/995,119, dated Aug. 31, 2017, 7 pgs.
Connell, Office Action, U.S. Appl. No. 14/965,142, dated Aug. 29, 2017, 12 pgs.
Connell, Notice of Allowance, U.S. Appl. No. 14/965,142, dated Feb. 26, 2018, 8 pgs.

(56) References Cited

OTHER PUBLICATIONS

Connell, Office Action, U.S. Appl. No. 15/280,876, dated Dec. 14, 2017, 23 pgs.
Connell, Office Action, U.S. Appl. No. 15/791,243, dated May 8, 2018, 12 pgs.
FlatPlate Heat Exchangers; GEA FlatPiate Inc.; website—http://www.flatplate.com/profile.html; date last visited Aug. 9, 2007; 3 pages.
Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.
Glacier Bay Inc., Darpa/Glacier Bay ECS, pages printed from a website, httir//web.archive.org/web/19991104132941/wvvw .glacierbay.com/darQatxt. htm, apparent archive date: Nov. 4, 1999, 2 pages.
Glacier Bay Inc., Glacier Bay ECS DARPA Project—Final Report, pages printed from a website, httn://web.archive.or_gjweb/19991103001512/v•vww ,_g.Jacierbay.com/Darnhtm.htm, apparent archive date: Nov. 3, 1999, 9 pages.
Glacier Bay Inc., Glacier Bay ECS DARPA Project—Project Photos, pages printed from a website, httg://web.archive.org/web/19991103012854/www.glacierbay.com/Dargghotos.htm, apparent archive date: Nov. 3, 1999, 2 pages.
Glacier Bay Inc., Glacier Bay ECS DARPA Project—Operational Video, page printed from a website, httQ://web.archive.orq/web/19991022221040/wvvw.qlacierbay.com/DarQvid.htm, apparent archive date Oct. 22, 1999; 1 page.
Glacier Bay Inc., R & D, pages printed from a website, htt ://web.archive.org/web/20000121130306/www.glacierbay.com/R&D.htm, apparent archive date: Jan. 21, 2000, 2 pages.
Glacier Bay Inc., Company History, pages printed from a website, httg://web.archive.org/web/20000301153828/www .g!acierbay.corn/History:.htrn, apparent archive date: Mar. 1, 2000; 2 pages.
Glacier Bay Inc., Contact, page printed from a website, httQ://web.archive.orq/web/19990508104511/W\"I!V .qlacierba:t.com/Contact.htm, apparent archive date: May 8, 1999; 1 page.
Michael Löhle, Günther Feuerecker and Ulrich Salzer; NON Idling HVAC-modufe tor Long Distance Trucks;SAE TechnicalPaper Series 1999-01-1193; International Congress and Exposition, Detroit, Michigan; Mar. 1-4, 1999; 8 pages.
Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 7 pages.
Mayo Mayo, Office Action, U.S. Appl. No. 15/034,517, dated Feb. 21, 2018, 22 pgs.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Paper No. 26 in IPR2012-00027, Jun. 11, 2013, 12 pgs. (7,591,303).
Patricia Gardie and Vincent Goetz; Thermal Energy Storage System by Solid Absorption for Electric Automobile Heating and Air-Conditioning; Paper; 1995, 5 pages.
TropiCool No-idle Heating & Cooling, 110V/12V High-efficiency, Self-contained, Electrified Heating/AC System; ACC Climate Control Brochure, Elkhart, Indiana; 2005, 1 page.
TropiCool Power Plus, More comfort. More efficiency. More options.; ACC Climate Control Brochure, Elkhart, Indiana; 2006, 3 pages.
Packless Industries, the leader in refrigerant to water coaxial heat exchangers, flexible hoses and sucti . . . ; website—http://www.packless.com/profile.htmle: date last visited Aug. 9, 2007; 1 page.
Zeigler, Office Action, U.S. Appl. No. 13/661,519, dated Mar. 11, 2013, 8 pgs.
Zeigler, Final Office Action, U.S. Appl. No. 13/661,519, dated Sep. 18, 2013, 15 pgs.
Zeigler, Office Action, U.S. Appl. No. 13/661,519, dated Apr. 9, 2014, 20 pgs.
Zeigler, Final Office Action, U.S. Appl. No. 13/661,519, dated Sep. 26, 2014, 23 pgs.
Zeigler, Office Action, U.S. Appl. No. 13/661,519, dated Oct. 28, 2015, 20 pgs.
Zeigler, Notice of Allowance, U.S. Appl. No. 13/661,519, dated Jun. 17, 2016, 8 pgs.
Bergstrom, Inc., International Search Report and Written Opinion, PCT/US2016/065812, dated Mar. 22, 2017, 12 pgs.
Bergstrom, Inc., International Preliminary Report on Patentability, PCT/US2016/065812, dated Jun. 12, 2018, 8 pgs.
Bergstrom, Inc. Extended European Search Report, EP16204267.5, dated Jul. 11, 2017, 8 pgs.
Bergstrom, Inc., 4th Office Action, CN201480027137.4, dated Jul. 26, 2018, 8 pgs.
Connell, Notice of Allowance, U.S. Appl. No. 15/280,876, dated Jun. 21, 2018, 8 pgs.
Connell, Office Action, U.S. Appl. No. 15/283,150, dated Sep. 27, 2018, 21pgs.
Mayo Mayo, Final Office Action, U.S. Appl. No. 15/034,517, dated Aug. 28, 2018, 9pgs.
Hansson, Office Action dated Oct. 5, 2018, U.S. Appl. No. 15/256,109, 14pgs.
Connell, Office Action, dated Oct. 19, 2018, U.S. Appl. No. 15/722,860, 7 pgs.
Bergstrom, Inc., International Search Report and Written Opinion, PCT/US2018/044093, dated Oct. 25, 2018, 13 pgs.
Bergstrom, Inc., Communication Pursuant to Article 94(3), EP14717604.4, dated Feb. 4, 2019, 5 pgs.
Bergstrom, Inc. Extended European Search Report, EP18177850.7, dated Nov. 28, 2018. 8 pgs.
Bergstrom, Inc., Notification of Grant, CN201480027137.4, dated Feb. 21, 2019, 1 pg.
Bergstrom, Inc., 3rd Office Action, CN201380081940.1, dated Jul. 30, 2018, 7 pgs.
Bergstrom, Inc., 1st Office Action, CN201680002224.3, dated Dec. 11, 2018, 5 pgs.
Connell, Notice of Allowance, U.S. Appl. No. 15/283,150, dated Mar. 22, 2019, 8 pgs.
Connell, Notice of Allowance, dated Feb. 7, 2019, U.S. Appl. No. 15/722,860, 5 pgs.
Connell, Notice of Allowance, U.S. Appl. No. 15/791,243, dated Jan. 24, 2019, 7 pgs.
Connell, Office Action, dated Apr. 18, 2019, U.S. Appl. No. 15/816,993, 17 pgs.
Hansson, Final Office Action, U.S. Appl. No. 15/256,109, dated May 2, 2019, 14 pgs.
Mayo Mayo, Final Office Action, U.S. Appl. No. 15/034,517, dated Nov. 30, 2018, 7 pgs.
Bergstrom, Inc., International Search Report and Written Opinion, PCT/US2017049859, dated Nov. 12, 2017, 9 pgs.
Bergstrom, Inc., International Preliminary Report on Patentability, PCT/US2017049859, dated Mar. 5, 2019, 6 pgs.
Bergstrom, Inc., International Search Report and Written Opinion PCT/US2017053196, dated Sep. 3, 2018, 17 pgs.
Bergstrom, Inc., International Preliminary Report on Patentability, PCT/US2017053196, dated Apr. 2, 2019, 11 pgs.
Bergstrom, Inc., International Search Report and Written Opinion PCT/US2016/423326, dated Sep. 27, 2016, 8 pgs.
Bergstrom, Inc., International Preliminary Report on Patentability PCT/US2016/423326, dated Jan. 16, 2018, 7 pgs.
Bergstrom, Inc., International Search Report and Written Opinion PCT/US2016/42307, dated Oct. 7, 2016, 8 pgs.
Bergstrom, Inc., International Preliminary Report on Patentability PCT/US2016/42307, dated Jan. 16, 2018, 7 pgs.
Bergstrom, Inc., International Search Report and Written Opinion PCT/US2016/42314, dated Sep. 30, 2016, 7 pgs.
Bergstrom, Inc., International Preliminary Report on Patentability, PCT/US2016/42314, dated Jan. 16, 2018, 6 pgs.
Bergstrom, Inc., International Search Report and Written Opinion PCT/US2016/42329, dated Sep. 30, 2016, 6 pgs.
Bergstrom, Inc., International Preliminary Report on Patentability PCT/US2016/42329, dated Jan. 16, 2018, 5 pgs.

(56) References Cited

OTHER PUBLICATIONS

Bergstrom, Inc., Communicaton Pursuant to Article 94(3), EP16820096.2, dated Aug. 12, 2019, 7 pgs.
Bergstrom, Inc., Communication Pursuant to Rules 161(1) and 162, EP17780954.8, dated May 10, 2019, 3 pgs.
Bergstrom, Inc., Extended European Search Report, EP19166779.9, dated Aug. 30, 2019, 8 pgs.
Bergstrom, Inc., Patent Certificate CN201480027137.4, May 31, 2019, 4 pgs.
Bergstrom, Inc., Letters Patent, CN201680002224.3, Sep. 10, 2019, 2 pgs.
Connell, Notice of Allowance, dated May 20, 2019, U.S. Appl. No. 15/722,860, 5 pgs.
Connell, Notice of Allowance, U.S. Appl. No. 15/791,243, dated May 15, 2019, 7 pgs.
Connell, Notice of Allowance, dated Sep. 26, 2019, U.S. Appl. No. 15/816,993, 8 pgs.
Connell, Office Action, U.S. Appl. No. 15/439,865, dated Sep. 24, 2019, 6 pgs.
Connell, Office Action, U.S. Appl. No. 15/660,734, dated Oct. 30, 2019, 24 pgs.
Hansson, Notice of Allowance, U.S. Appl. No. 15/256,109, dated Sep. 24, 2019, 9 pgs.
TYCO Electronics Corporation, "MAG-MATE Connector with Multispring Pin," Datasheet, 2013, pp. 1-2 from <URL: http://datasheet.octopart.com/1247003-2-TE-Connectivity-datasheet-14918754.pdf>.

\* cited by examiner

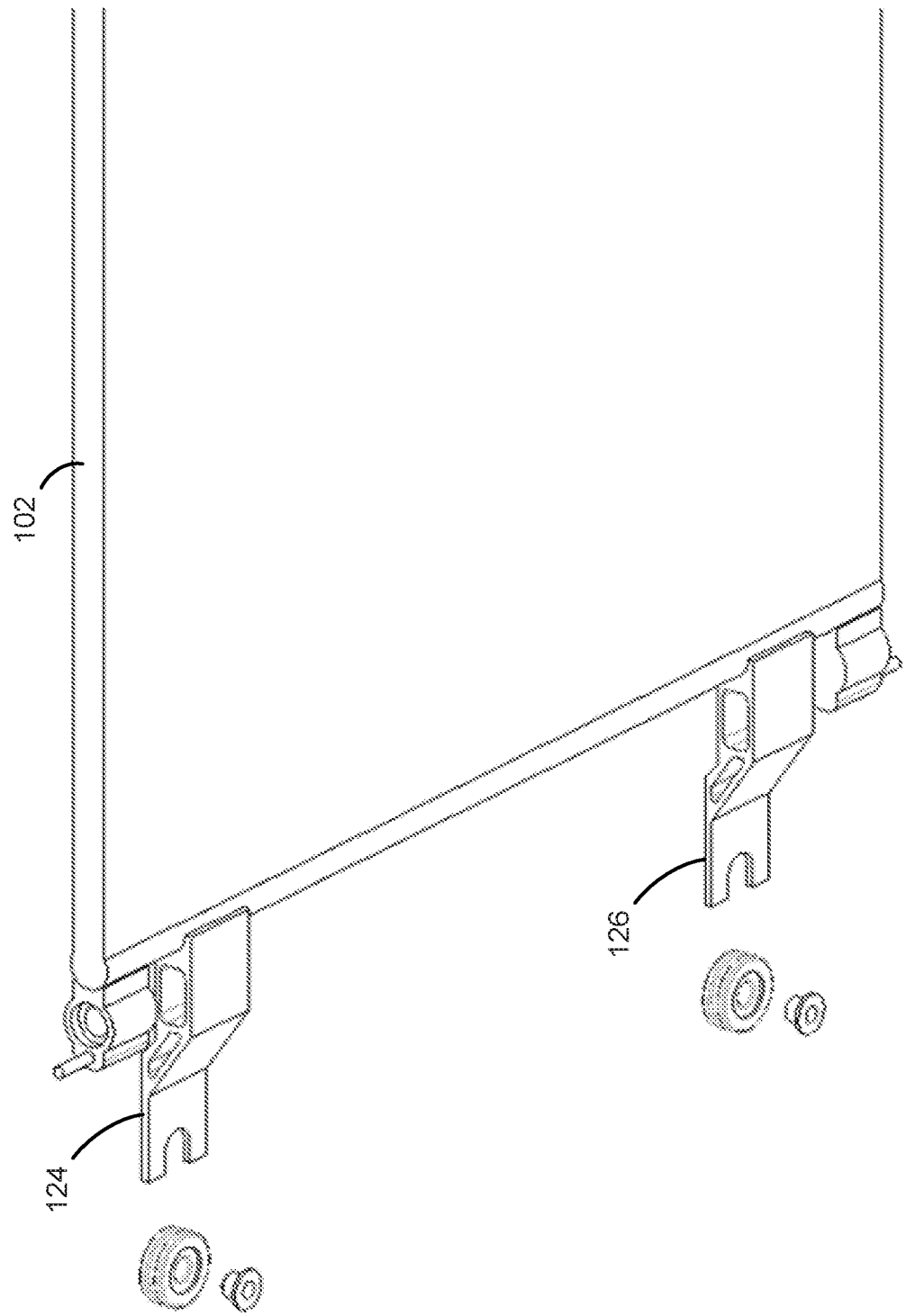

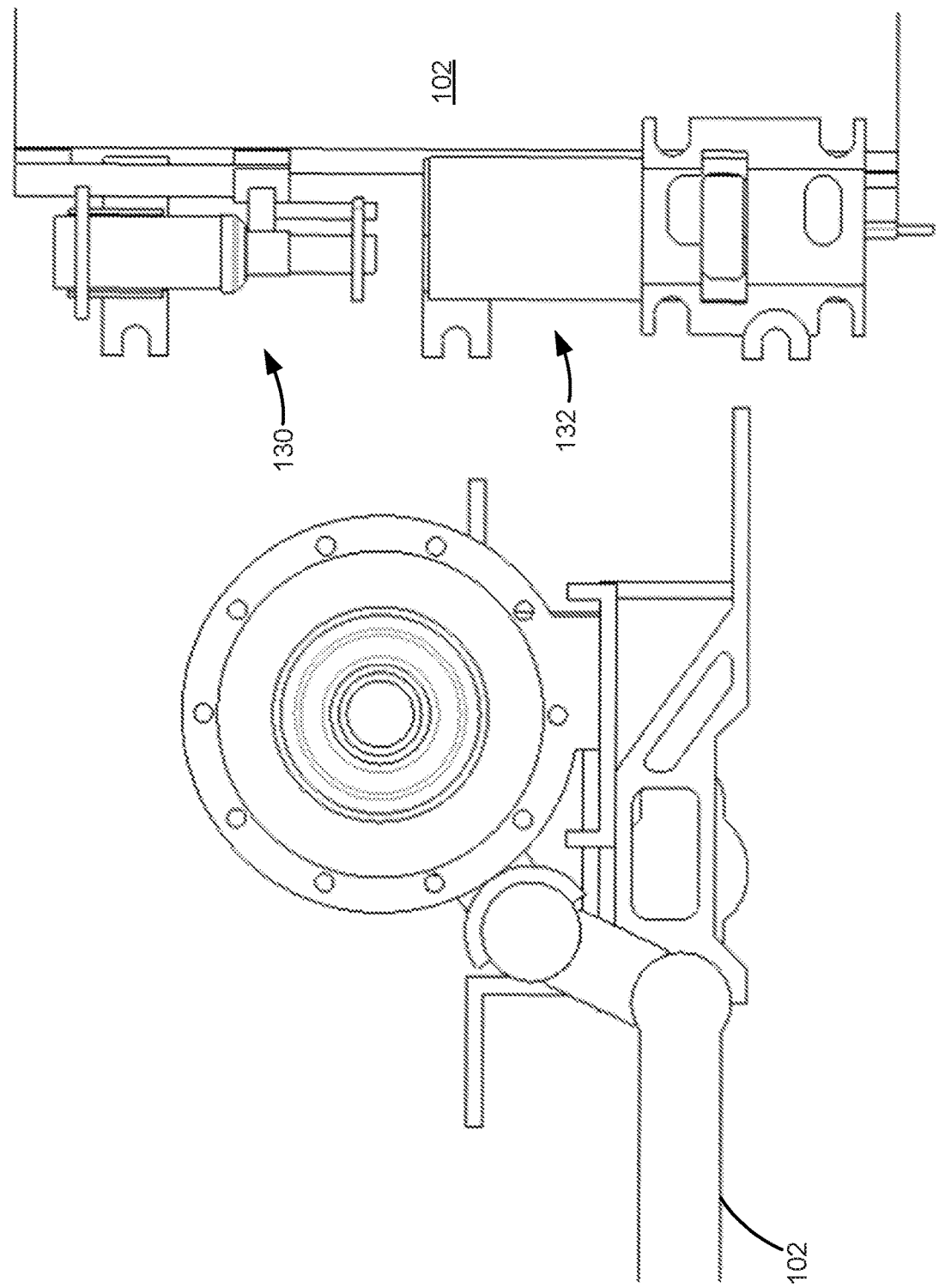

FIG. 11B
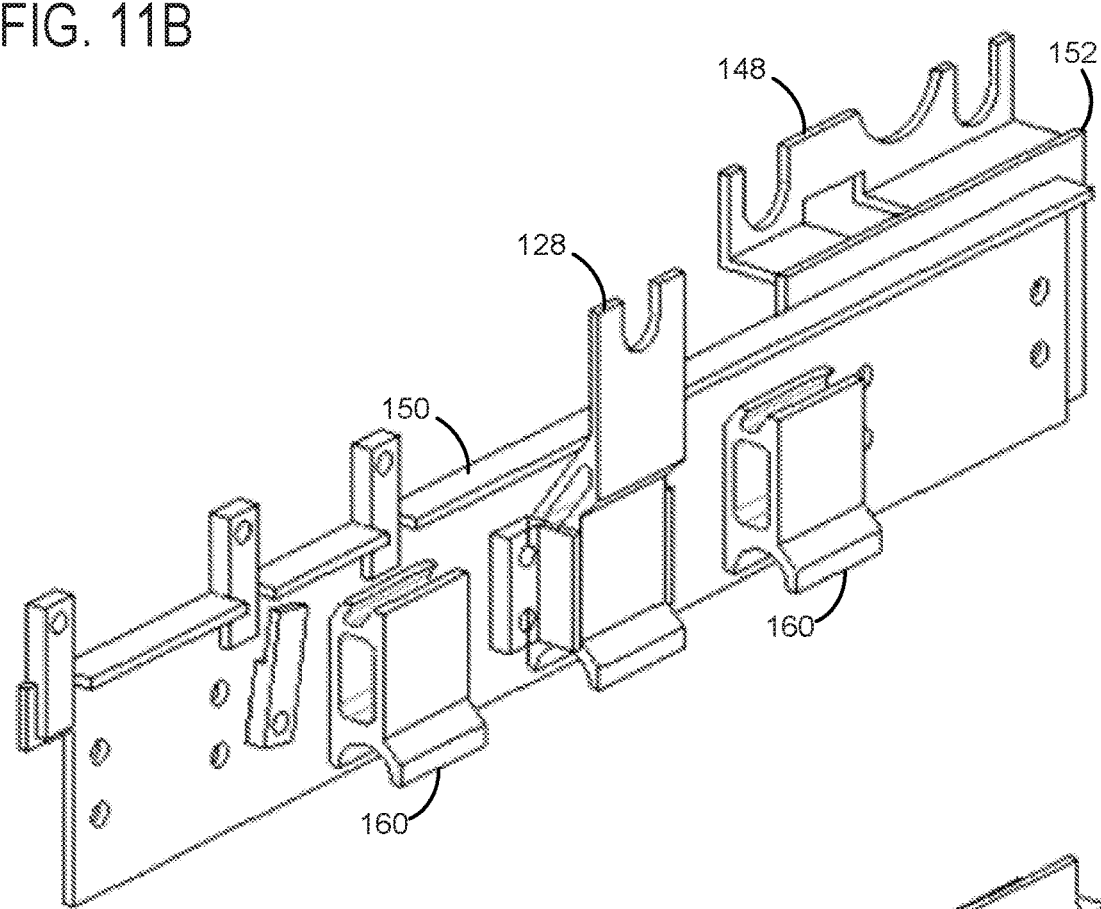
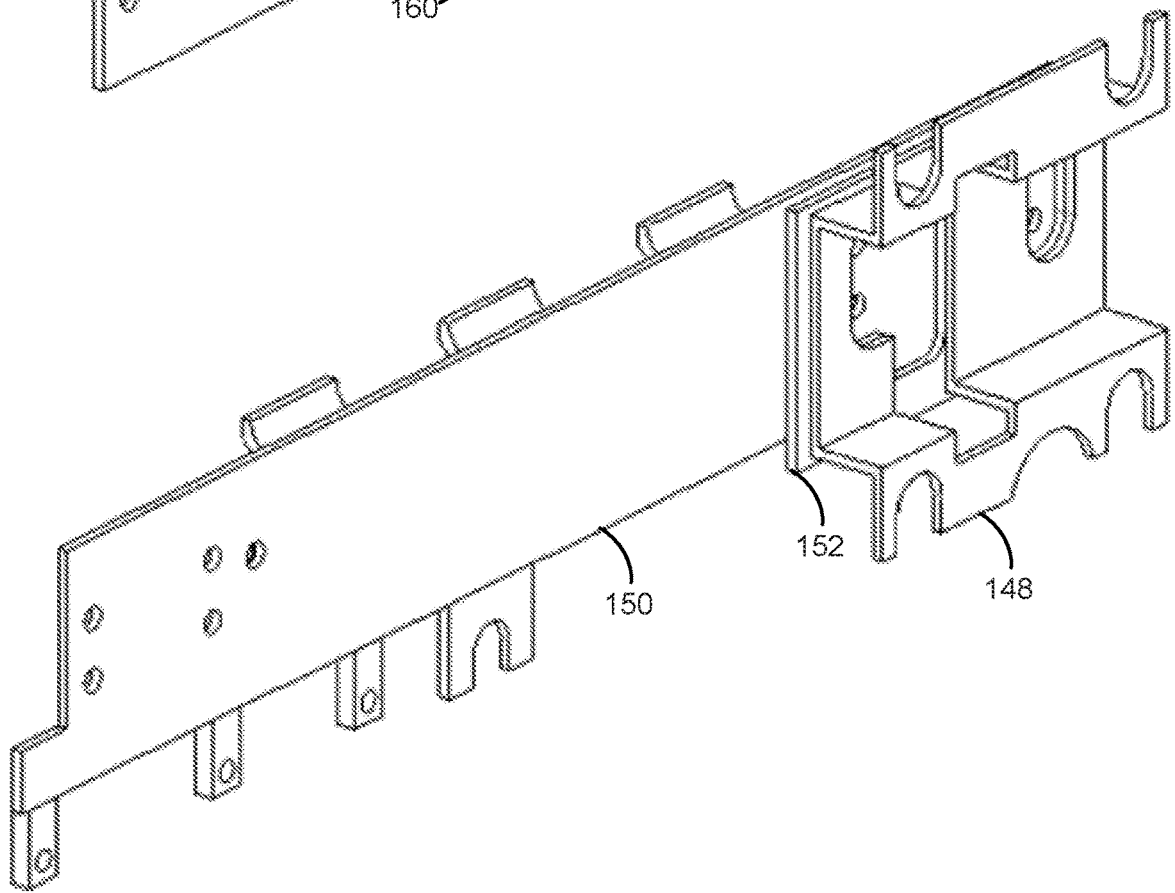
FIG. 11A

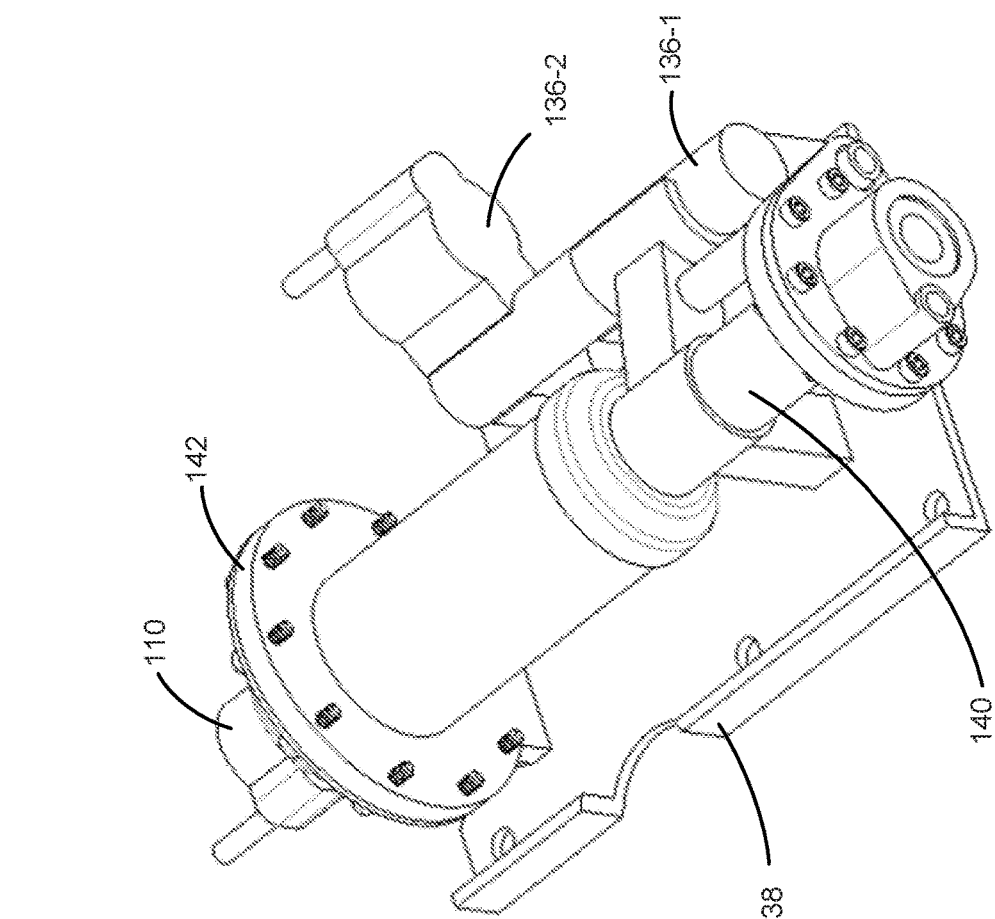
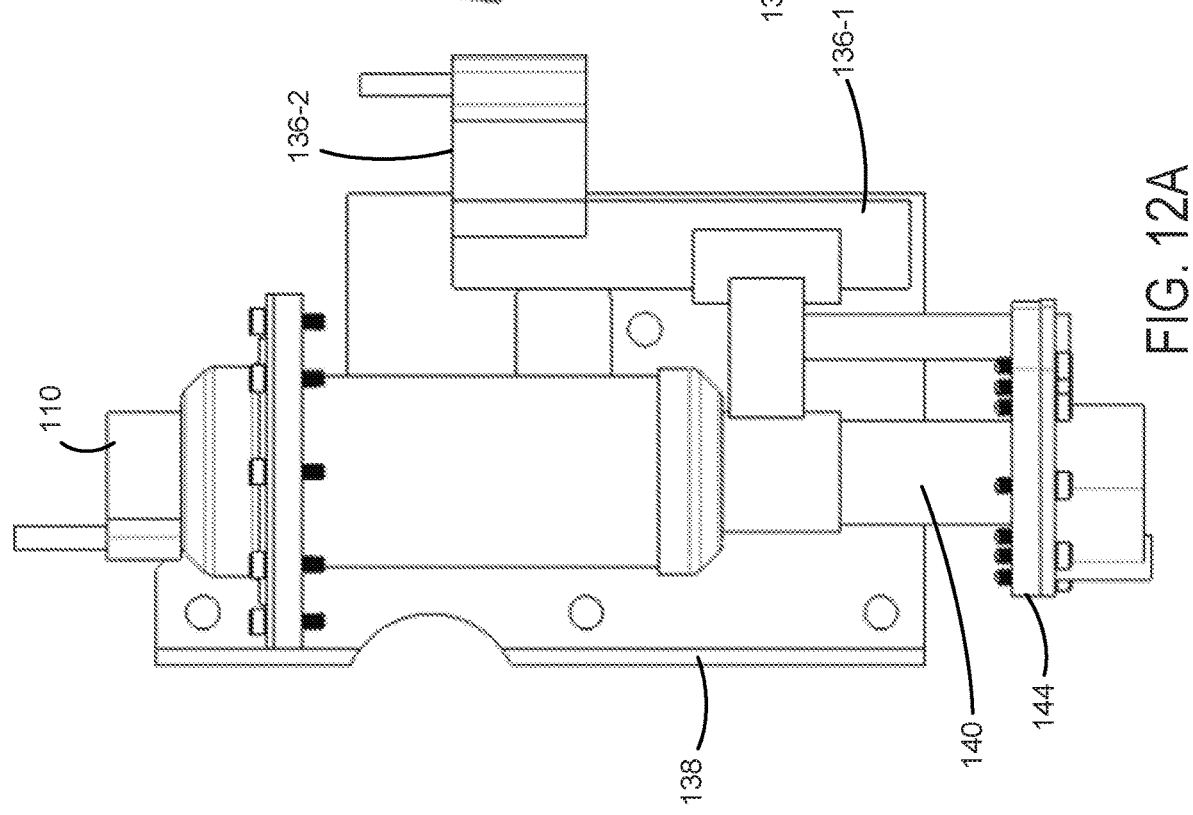
FIG. 12B
FIG. 12A

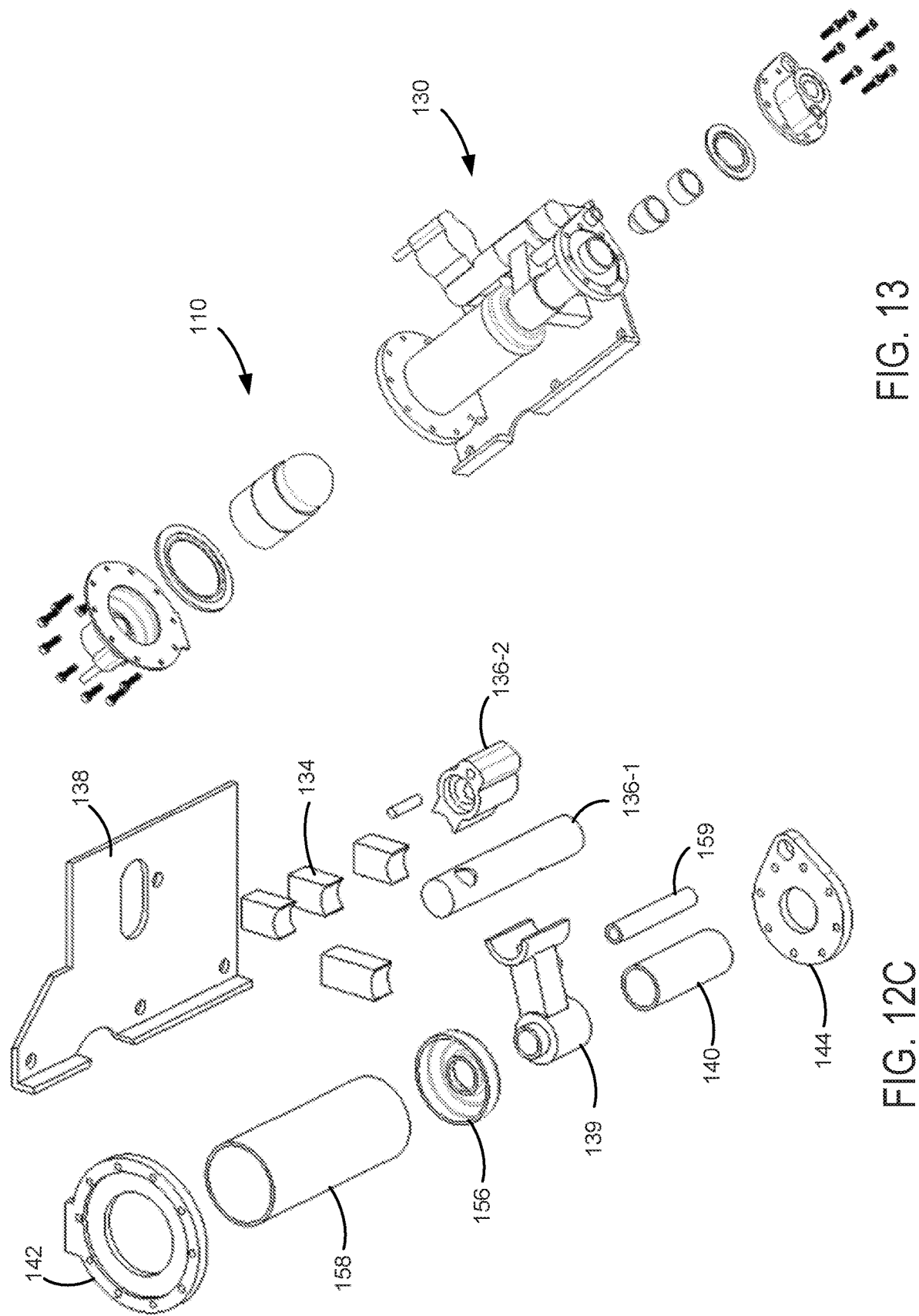

INTEGRATED CONDENSER AND COMPRESSOR SYSTEM

FIELD OF THE INVENTION

The present invention generally relates to a system configured to be integrated with an existing air conditioning system. More particularly, the present invention relates to an integrated compressor system including a compressor, a valve, and a mounting assembly, and configured to be integrated with an existing or modified condenser of an air conditioning system used in vehicles.

BACKGROUND

Currently, many existing vehicle heating, ventilation, and air conditioning (HVAC) systems have only one compressor driven by the engine of the vehicle. These HVAC systems cannot be operated and thus cannot provide a comfortable environment for drivers and passengers when the engine of the vehicle is off. In response to the needs of the transportation industry and the regulations governing the amount of time that a driver may spend behind the wheel, it is very desirable to have an HVAC system with multiple compressors connected to different power sources, for example, one powered by the engine and one powered by an electric source. Such an HVAC system can provide a comfortable environment for drivers and passengers when the engine of the vehicle is on as well as when it is off.

Integrating an electrically driven system into the existing engine driven system addresses some of these issues, but raises others. For example, many of the components of an existing engine driven HVAC system are located within the engine compartment, and, therefore, integration of an additional compressor into the existing vehicle HVAC system is difficult as there is limited space within an engine compartment for an additional compressor.

Given the above, there is a need in the art for a combined engine/electrically driven HVAC system that addresses the abovementioned issues.

The information disclosed in this Background section is provided for an understanding of the general background of the invention and is not an acknowledgement or suggestion that this information forms part of the prior art already known to a person skilled in the art.

SUMMARY

Various aspects of the present invention provide an integrated compressor system configured to be integrated with existing air conditioning systems.

In one embodiment, the integrated system of the present invention comprises a mounting assembly, a first compressor and a valve. The mounting assembly is configured to be mounted directly on a condenser of an existing air conditioning system. The first compressor is configured to compress a refrigerant and comprise a compressor inlet and a compressor outlet. The first compressor is mounted or to be mounted directly on the mounting assembly. In a preferred embodiment, the first compressor is an electric compressor. The valve is also mounted or to be mounted directly on the mounting assembly. The valve comprises a first valve inlet fluidly coupled to the compressor outlet of the first compressor, a second valve inlet configured to be fluidly coupled to a compressor outlet of a second compressor, and a valve outlet to be fluidly connected to a condenser inlet of the condenser.

In another embodiment, the integrated system of the present invention comprises a condenser, a mounting assembly, a first compressor and a valve. The condenser has a condenser inlet. The mounting assembly is configured to be mounted directly on the condenser. The first compressor is configured to compress a refrigerant and comprise a compressor inlet and a compressor outlet. The first compressor is mounted or to be mounted directly on the mounting assembly. In a preferred embodiment, the first compressor is an electric compressor. The valve is also mounted or to be mounted directly on the mounting assembly. The valve comprises a first valve inlet fluidly coupled to the compressor outlet of the first compressor, a second valve inlet configured to be fluidly coupled to a compressor outlet of a second compressor, and a valve outlet to be fluidly connected to a condenser inlet of the condenser.

In some embodiments, the mounting assembly comprises one or more mounting brackets directly and fixedly coupled to the condenser. In some embodiments, the mounting assembly further comprises a valve mounting assembly configured to hold the valve and a compressor mounting assembly configured to hold the first compressor. In an embodiment, the valve mounting assembly and the compressor mounting assembly are directly and fixedly coupled to the condenser or one or more mounting brackets of the mounting assembly. In another embodiment, the valve mounting assembly and the compressor mounting assembly are directly and fixedly coupled to both the condenser and one or more mounting brackets of the mounting assembly.

In some embodiments, the mounting assembly comprises a variety of components such as brackets, spacers or rings. In an embodiment, some or all of these components are pre-assembled together for example by mechanical fastening, brazing, O-ring type sealing, welding or made together by casting. In another embodiment, all or most of these components are separate and not pre-assembled.

The integrated system of the present invention have other features and advantages that will be apparent from or are set forth in more detail in the accompanying drawings, which are incorporated herein, and the following Detailed Description, which together serve to explain certain principles of the present invention.

BRIEF DESCRIPTION OF THE DRAWINGS

The accompanying drawings, which are incorporated into and constitute a part of this specification, illustrate one or more embodiments of the present application and, together with the detailed description, serve to explain the principles and implementations of the application.

FIG. 1B illustrates mounting brackets of the condenser of FIG. 1A.

FIGS. 8A-8E are assembled top-front perspective view, disassembled perspective view, assembled back perspective view, top view and front view, illustrating the first exemplary mounting assembly coupled to a condenser in accordance with some embodiments of the present invention.

FIGS. 11A and 11B are front and back perspective views, illustrating some components of the second exemplary mounting assembly in accordance with some embodiments of the present invention.

FIGS. 12A-12C are front, assembled perspective and disassembled perspective views, illustrating some components of the second exemplary mounting assembly in accordance with some embodiments of the present invention.

FIG. 13 is a partially disassembled perspective view, illustrating a valve mounted on the second exemplary mounting assembly in accordance with some embodiments of the present invention

DETAILED DESCRIPTION

Reference will now be made in detail to implementations of the present application as illustrated in the accompanying drawings. The same reference indicators will be used throughout the drawings and the following detailed description to refer to the same or like parts. Those of ordinary skill in the art will realize that the following detailed description of the present application is illustrative only and is not intended to be in any way limiting. Other embodiments of the present application will readily suggest themselves to such skilled persons having benefit of this disclosure.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Embodiments of the present invention are described in the context of systems integrated or to be integrated with existing air conditioning (AC) systems, and in particular, in the context of systems integrated or to be integrated with condensers of existing AC systems used in vehicles. The vehicle can be a car, a van, a truck, a bus, a trailer, or any other vehicle or machines such as off-highway/agriculture/mining equipment that includes an HVAC system.

Figure 1A:
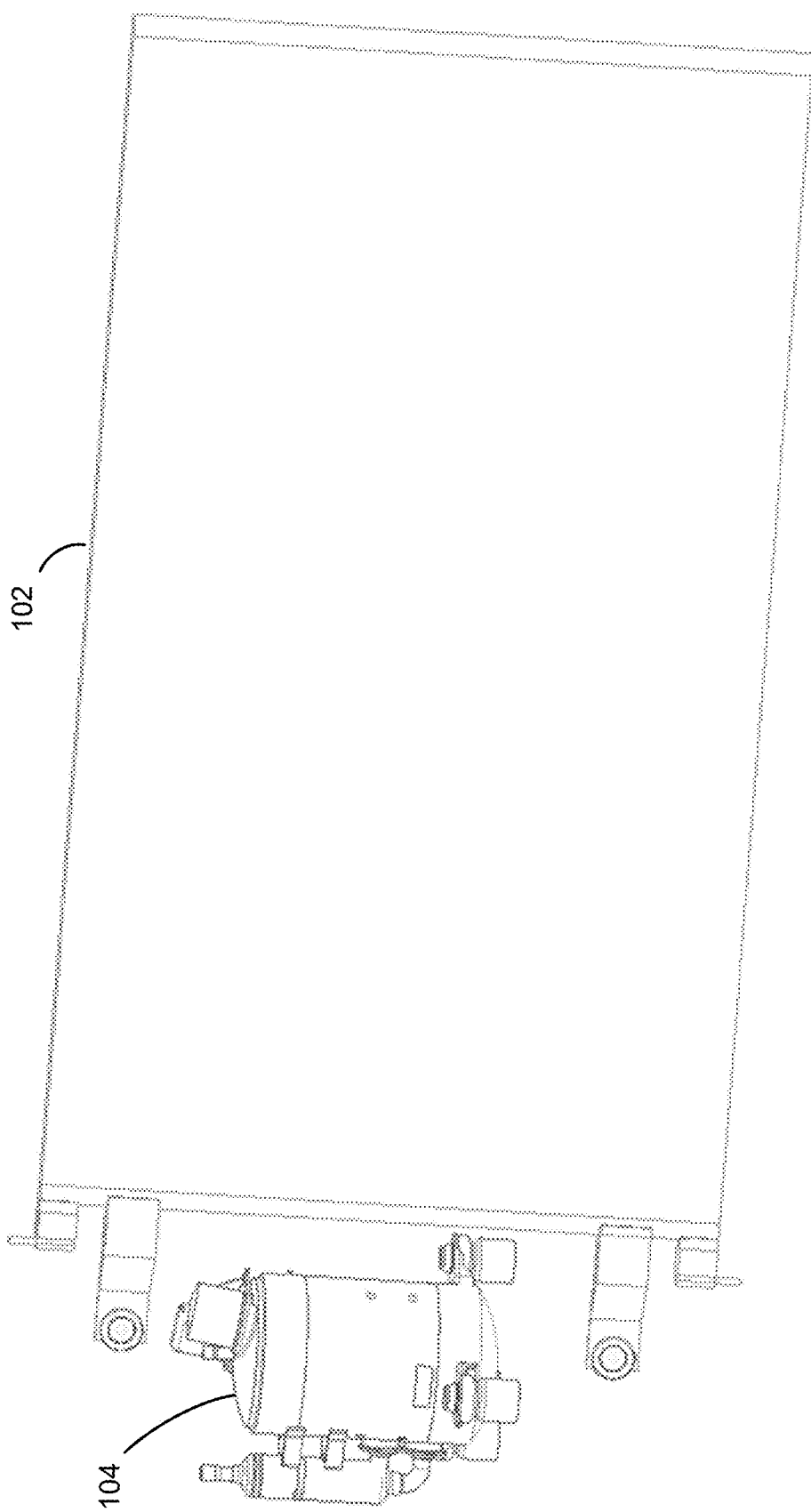
FIG. 1A illustrates a secondary compressor and a condenser.

FIGS. 1A and 1B show a condenser 102 of an existing vehicle HVAC system and a conventional secondary compressor 104. The condenser 102 usually includes two mounting brackets 124, 126. Because of the size, shape and weight of the conventional secondary compressor, it is very difficult, if not impossible, to mount the conventional secondary compressor onto the condenser.

To solve this and/or other problems, the present invention provides a mounting assembly, a first compressor and a valve. The first compressor is configured to be mounted onto a condenser, such as an existing or modified condenser of an AC system used in vehicles. The valve is configured to allow a refrigerant compressed by the first compressor or by a second compressor (e.g., a compressor of an existing AC system) to pass into the condenser. The mounting assembly is configured to mount the first compressor and the valve to the condenser. Preferably, the mounting assembly is mounted directly or configured to be mounted directly to the condenser, and the first compressor and the valve are mounted directly on the mounting assembly. As used herein, the term "directly" refers to a configuration, in which two components are in physical contact with each other.

Figure 2:
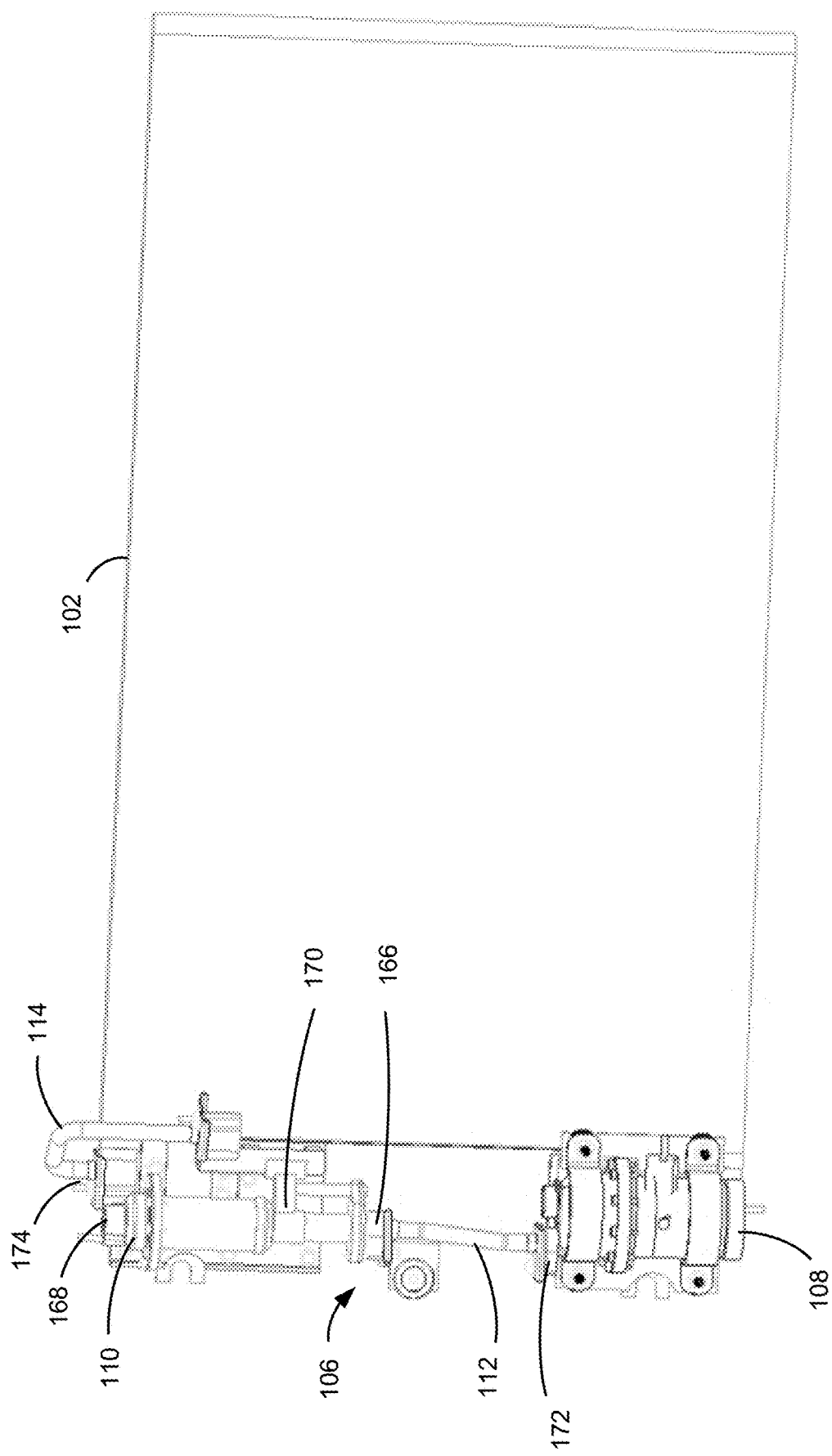
FIG. 2 illustrates an integrated system mounted on a condenser in accordance with some embodiments of the present invention.
Figure 7A:
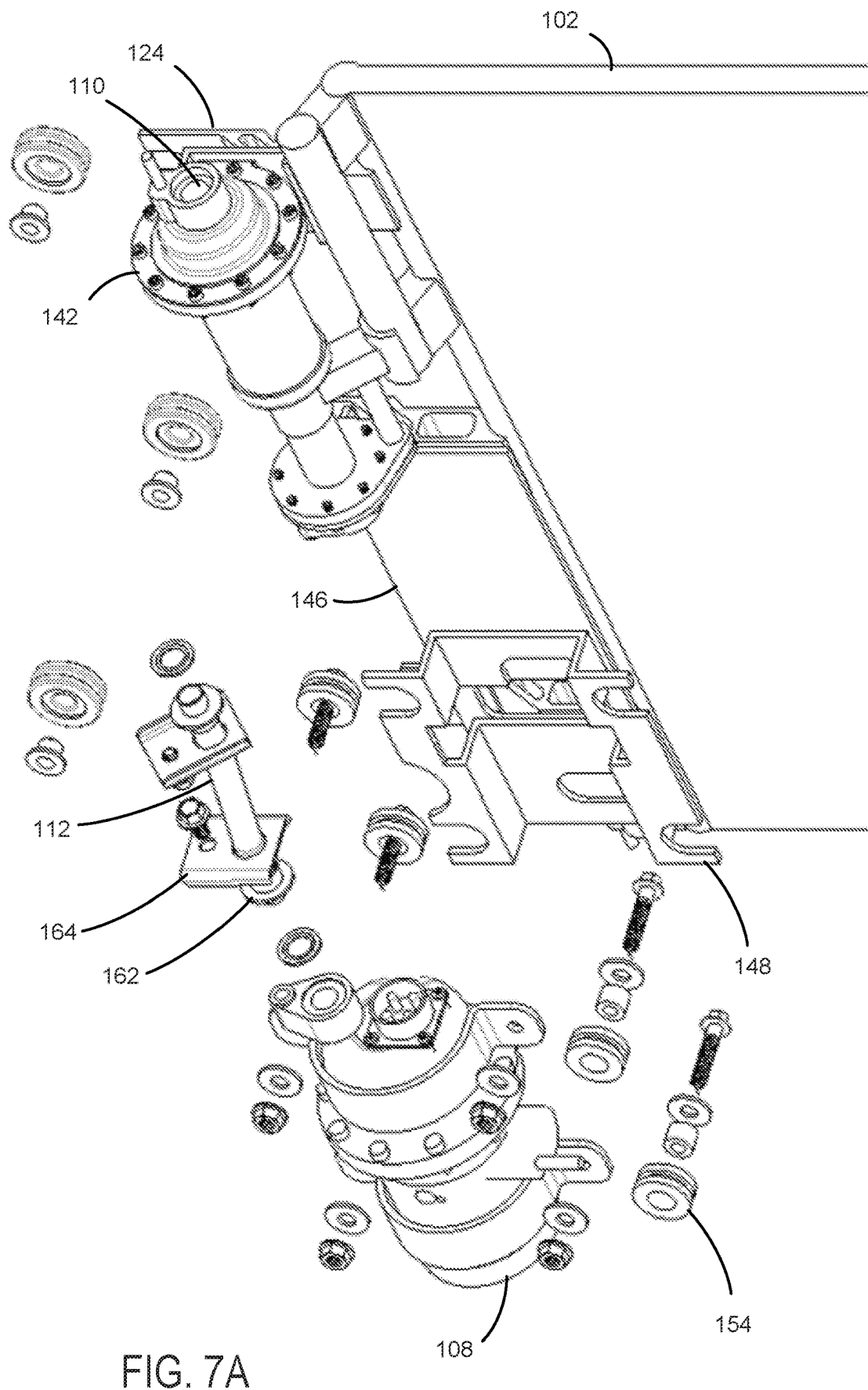
FIGS. 7A-7C are partially disassembled perspective view, front view and side view, illustrating an integrated system comprising a first exemplary mounting assembly in accordance with some embodiments of the present invention.

FIG. 2 illustrates an integrated system in accordance with some embodiments of the present invention. As shown, the system of the present invention comprises a mounting assembly 106, a first compressor 108 and a valve 110. The first compressor 108 comprises a compressor inlet and a compressor outlet. The valve 110 comprises a first valve inlet 166, a second valve inlet 168, and a valve outlet 170. In a preferred embodiment, the mounting assembly 106 is configured to be mounted directly on a condenser 102, such as an existing or modified condenser of an AC system mounted in the engine compartment of a vehicle. The first compressor 108 and the valve 110 are mounted or configured to be mounted directly on the mounting assembly 106. When assembled, the first valve inlet 166 is fluidly coupled to the compressor outlet 172 of the first compressor 108. In some embodiments, the valve 110 and the first compressor 108 are configured such that the first valve inlet 166 is directed connected to the compressor outlet 172 of the first compressor 108. In some embodiments, the system of the present invention further comprises a first refrigerant tube 112 connecting the compressor outlet 172 of the first compressor 108 to the first valve inlet 166 of the valve 110. In some embodiments, to ensure the strength of the connection, the system of the present invention further comprises one or more fittings 162 (e.g., brass fittings for tight slim-line seal) or one or more brackets 164 (e.g., steel or copper mounting brackets) as illustrated in FIG. 7A.

Figure 14:
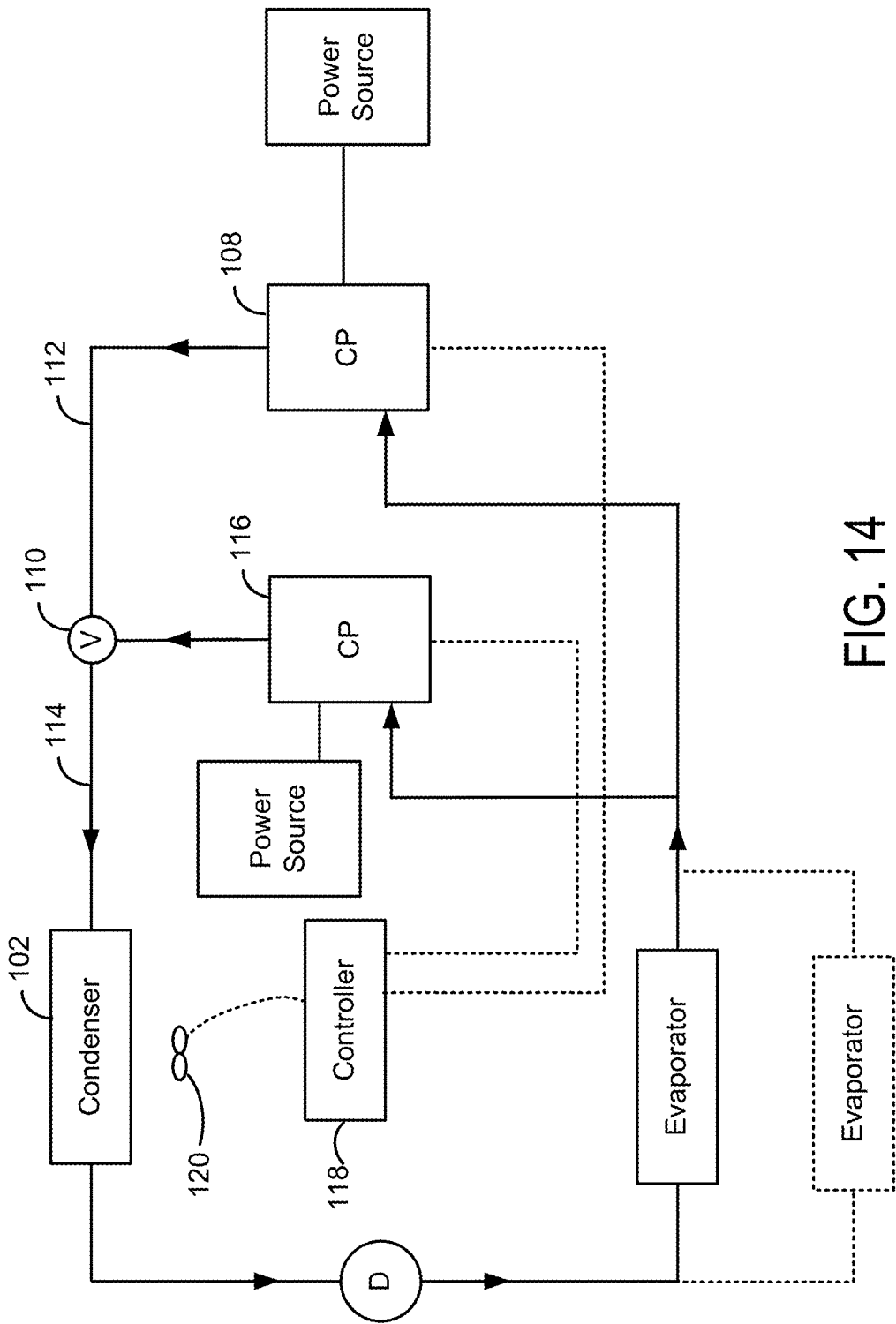
FIG. 14 is a schematic diagram illustrating an exemplary integration of the system with an existing air conditioning system.

When integrated with an existing AC system, the second valve inlet 168 is fluidly coupled to a compressor outlet of a second compressor 116 (e.g., a compressor of the existing AC system as illustrated in FIG. 14), and the valve outlet 170 is to be fluidly connected to a condenser inlet 174 of the condenser 102. In some embodiments, the system of the present invention further comprises a second refrigerant tube 114 for connecting the valve outlet 168 of the valve to the condenser inlet 174 of the condenser 102. In some embodiments, the system of the present invention is integrally made or manufactured with the condenser 102. In some embodiments when the system is integrated with an air-conditioning system used in vehicles, the second compressor (e.g., the existing compressor of the air-conditioning system) is driven (e.g., belt-driven) by the engine of the vehicle and can be used to compress the refrigerant when the engine of the vehicle is on (i.e., when the engine is running).

Preferably, the first compressor 108 is an electric compressor and is operated independently from the second compressor. When used in vehicles, the first compressor 108 can be used to compress a refrigerant when the engine of the vehicle is off, for example, before a driver or passenger enters into the vehicle or when the engine is off. It can also be used to compress a refrigerant when the cooling demand is below the cooling capacity of the exciting AC system to reduce energy consumption and operation cost.

In some embodiments, the system of the present invention can operate up to 2 hours, 3 hours, 4 hours and 5 hours, and provide power up to 3500 BTU/hr, 4500 BTU/hr, or 5500 BTU/hr. The system is relatively small and fits most of AC systems. In some embodiments, for example, as those illustrated in FIGS. 3-4, the largest cross-sectional dimension of the first compressor is less than 3.5 inches, less than 4 inches, less than 4.5 inches or less than 5 inches. The system, without the condenser, weighs about 15 lbs.

Figure 3B:
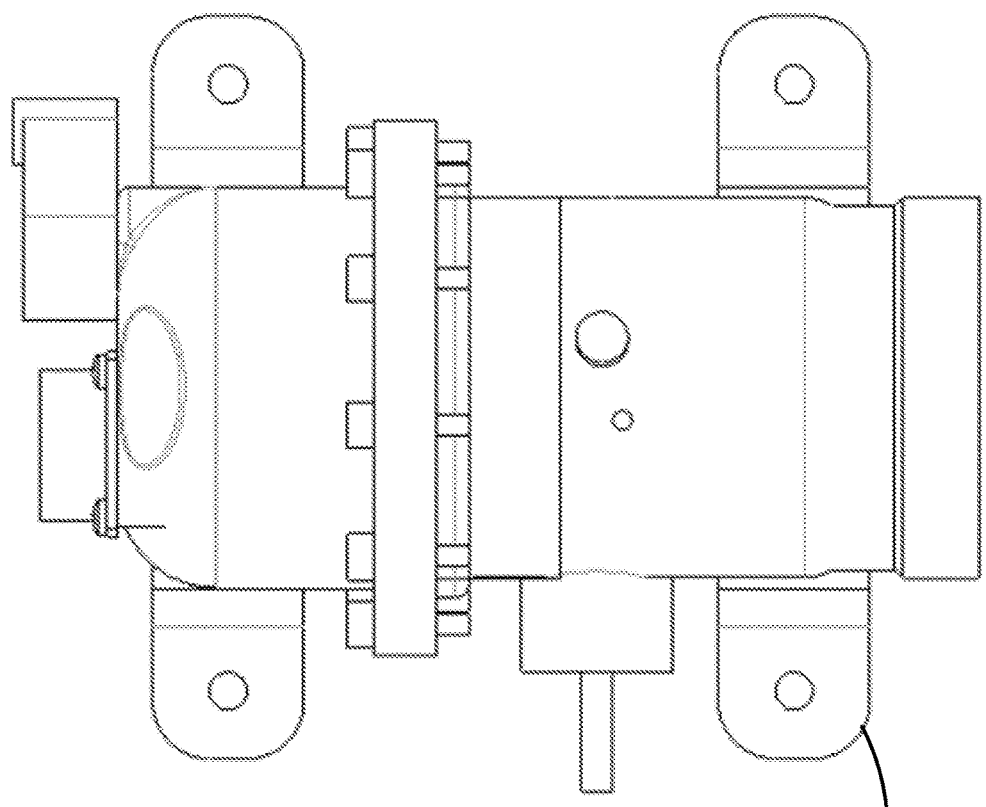
FIGS. 3A and 3B are perspective and back view of a compressor in accordance with some embodiments of the present invention.
Figure 3A:
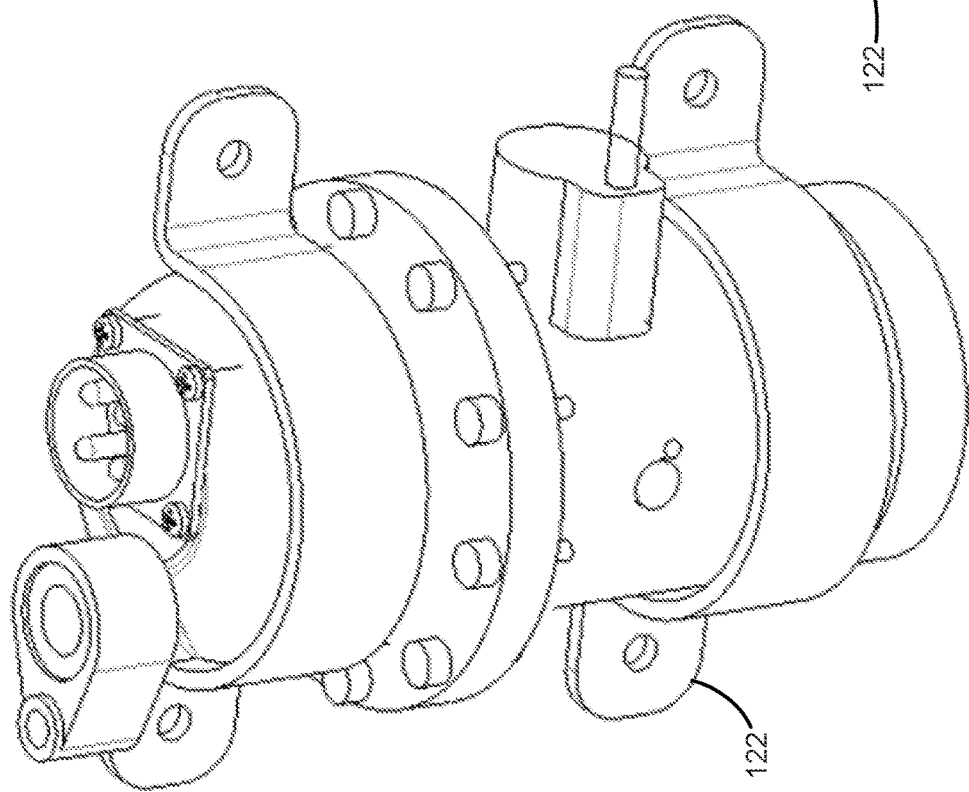
Figure 4:
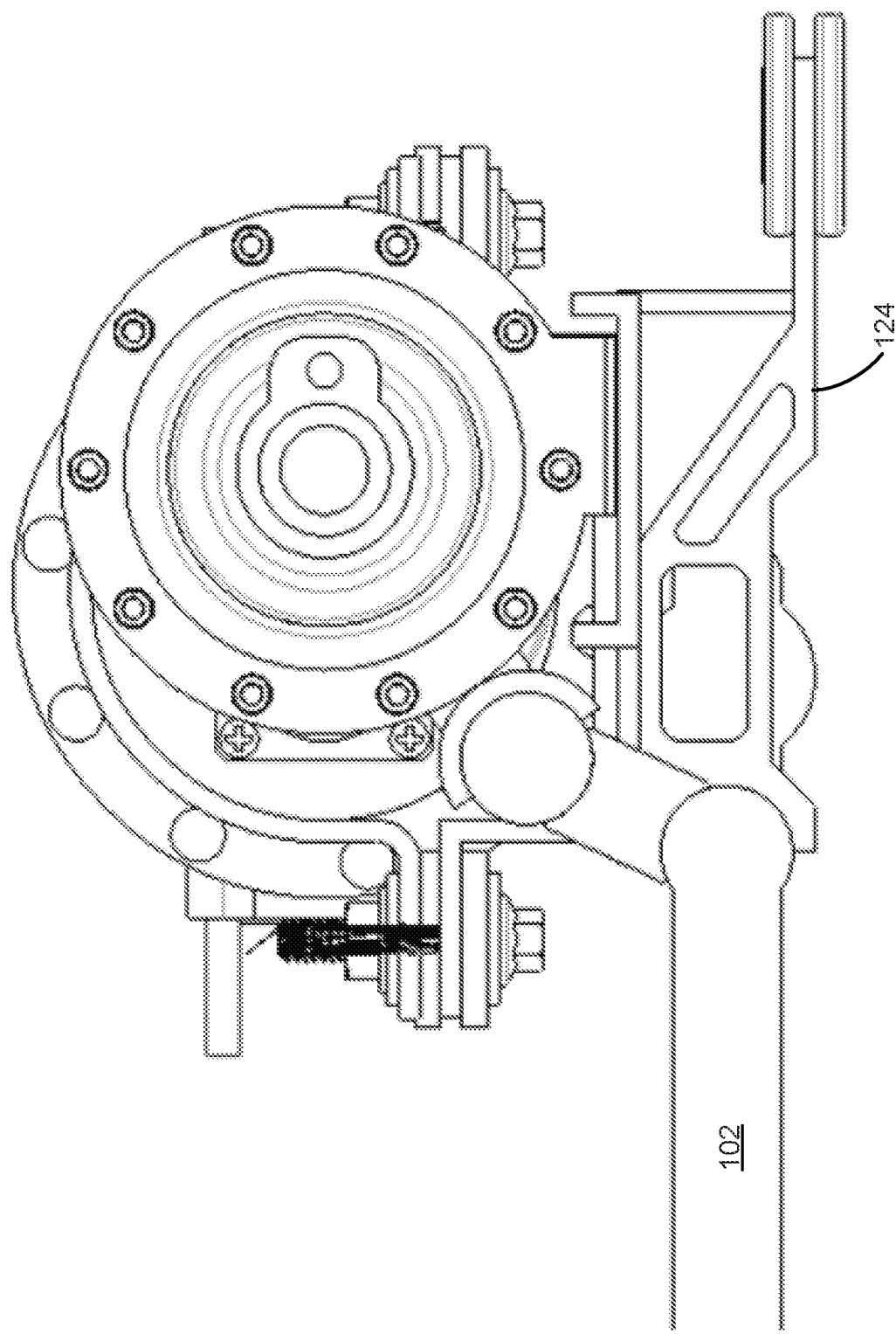
FIG. 4 is a top view of an integrated system in accordance with some embodiments of the present invention.

In some embodiments, to facilitate mounting of the first compressor, the first compressor 108 comprises one or more mounting brackets 122 attached (e.g., by welding) to a wall of the first compressor. By way of illustration, FIGS. 3A and 3B illustrate two essentially U-shaped mounting brackets 122 with substantially the same contour as the outer circumference of the first compressor. The mounting brackets 122 are configured to be coupled to the mounting assembly 106.

Figure 6A:
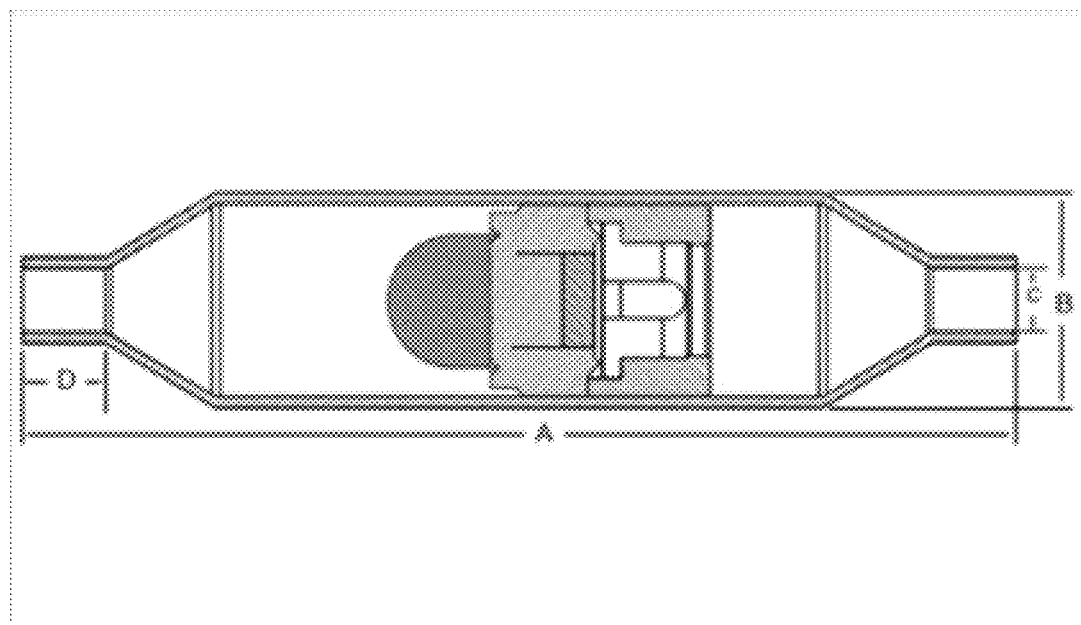
FIGS. 6A and 6B illustrate exemplary valves of an integrated system in accordance with some embodiments of the present invention.
Figure 6B:
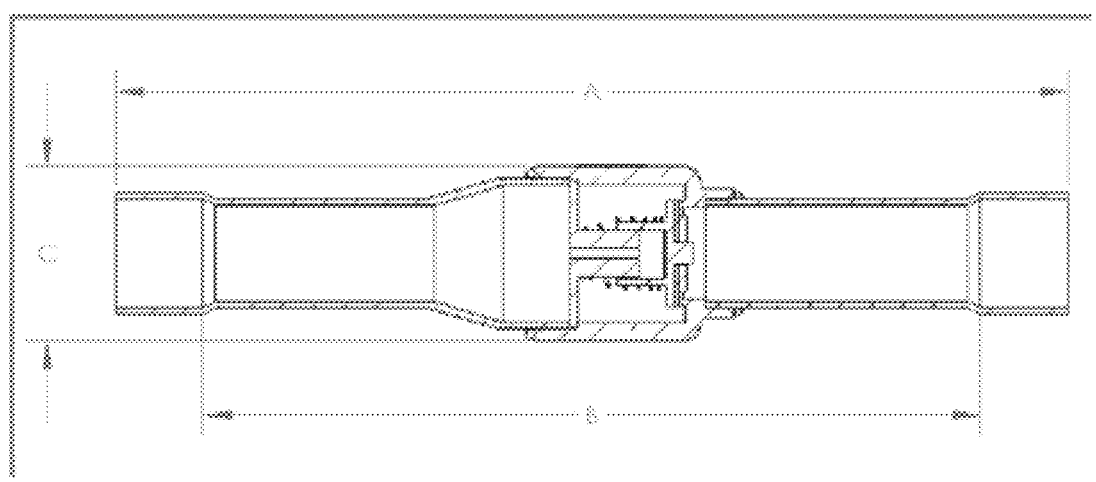

The valve 110 (As illustrated in FIG. 2) is generally a check valve with at least two inlets and at least one outlet. The first valve inlet 166 is fluidly coupled to the compressor outlet 172 of the first compressor 108. When integrated with an existing AC system, the second valve inlet 168 is fluidly coupled to the compressor outlet of the second compressor 116 (e.g., the compressor of the existing AC system in FIG. 14), and the valve outlet 170 is fluidly connected to the condenser inlet 174 of the condenser 102. Any suitable check valves, including but not limited to magnetic valves, spring-load valves, electronic solenoid valve, and electronic stepper valves, can be used. By way of illustration, FIG. 6A shows a magnetic valve and FIG. 6B shows a spring-load valve. In some embodiments, a magnetic valve is preferred because it performs better in a vertical orientation, has fewer parts, and is less prone to failure.

Figure 5B:
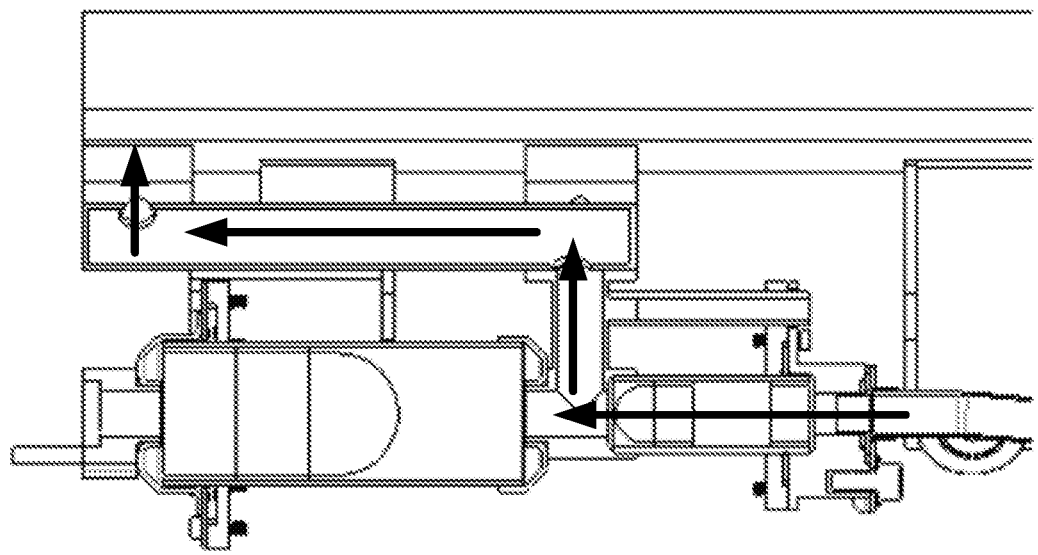
FIGS. 5A and 5B illustrate refrigerant flow in an integrated system in accordance with some embodiments of the present invention.
Figure 5A:
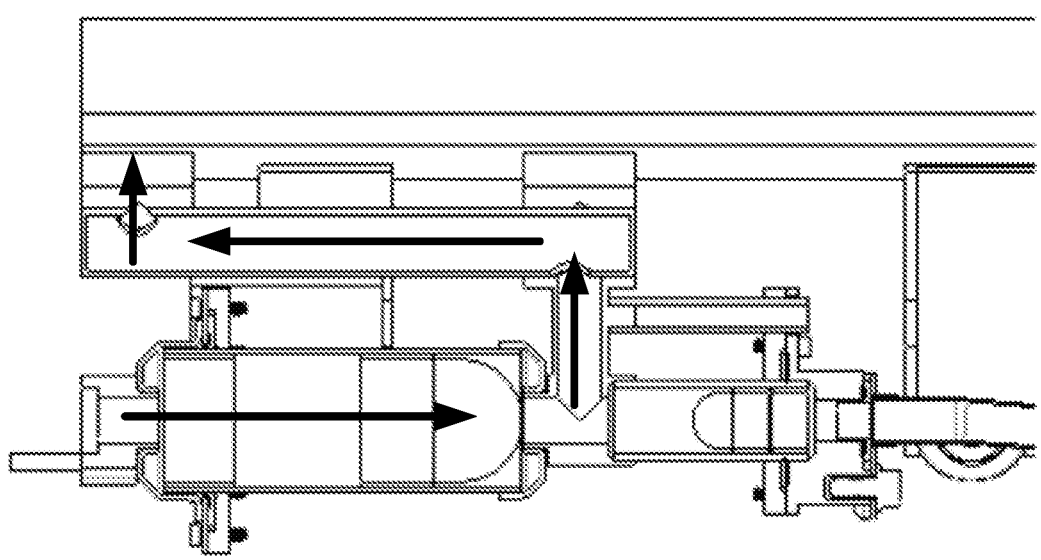

By design, a valve can be held in an open, closed, or any particular position, for example, by a magnetic force or a spring. Once a valve is selected and connected to the system, operation (e.g., movement) of the valve generally depends on the direction of the flow, and more particularly, the flow pressure. By way of illustration, FIGS. 5A and 5B illustrate an exemplary movement of the valve 110. As shown, when the second compressor (e.g., the engine driven compressor of the existing AC system) is on, the compressed refrigerant from the second compressor pushes the valve downward, in some cases against the magnetic force if a magnetic valve is used or against a spring if a spring-load valve is used, and opens a manifold 136 for the compressed refrigerant from the second compressor to pass through and flow to the condenser 102. When the second compressor is off and the first compressor is on, the compressed refrigerant from the first compressor pushes the valve upward, and opens up the manifold 136 for the compressed refrigerant from the first compressor to pass through and flow to the condenser 102. It should be understood that the terms "downward" or "upward" are used to describe features of the exemplary embodiments with reference to the positions of such features as displayed in the figures. The valve is not necessarily oriented vertically either in the integrated system or after the system has been integrated with an existing AC system.

Figure 7B:
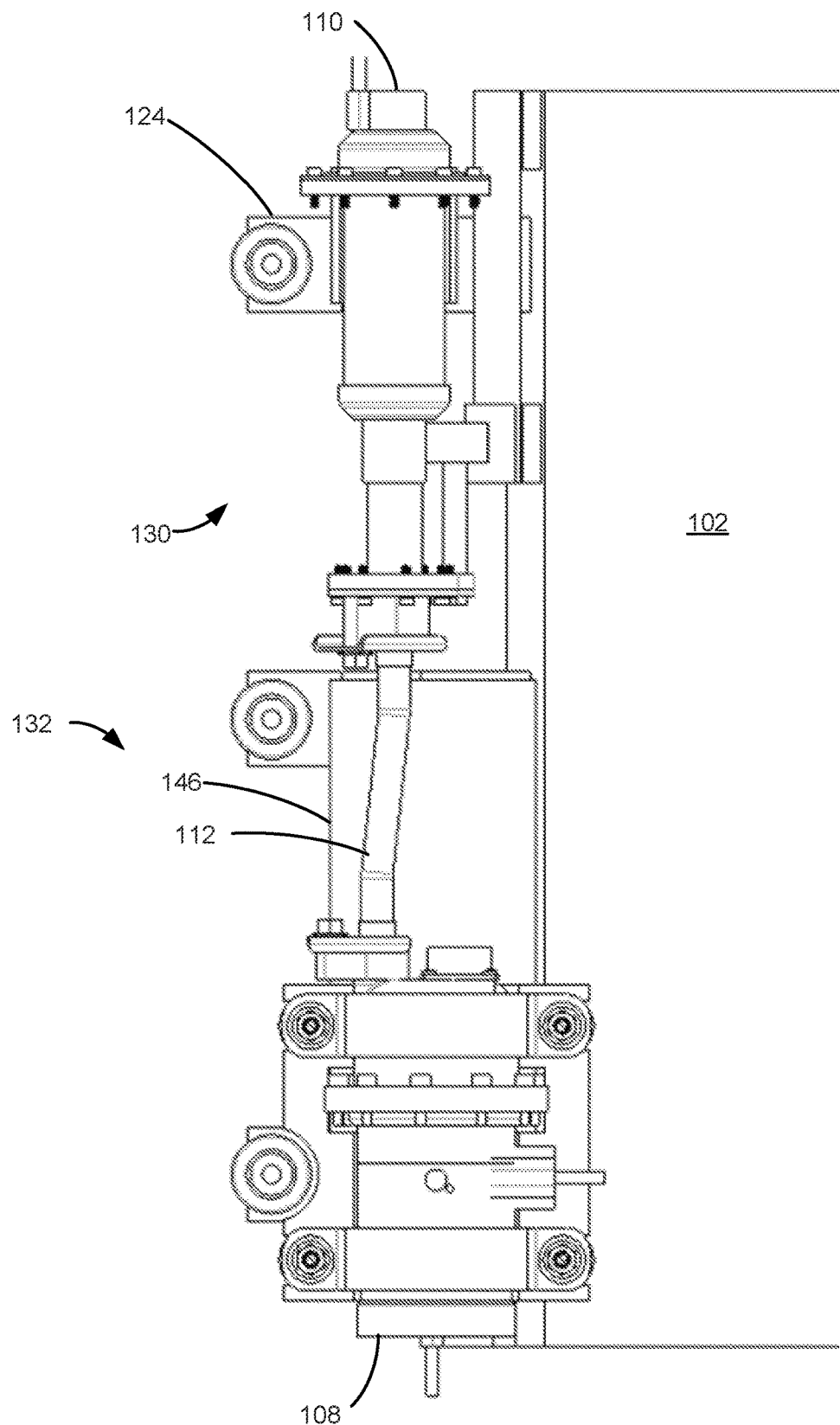
Figure 10A:
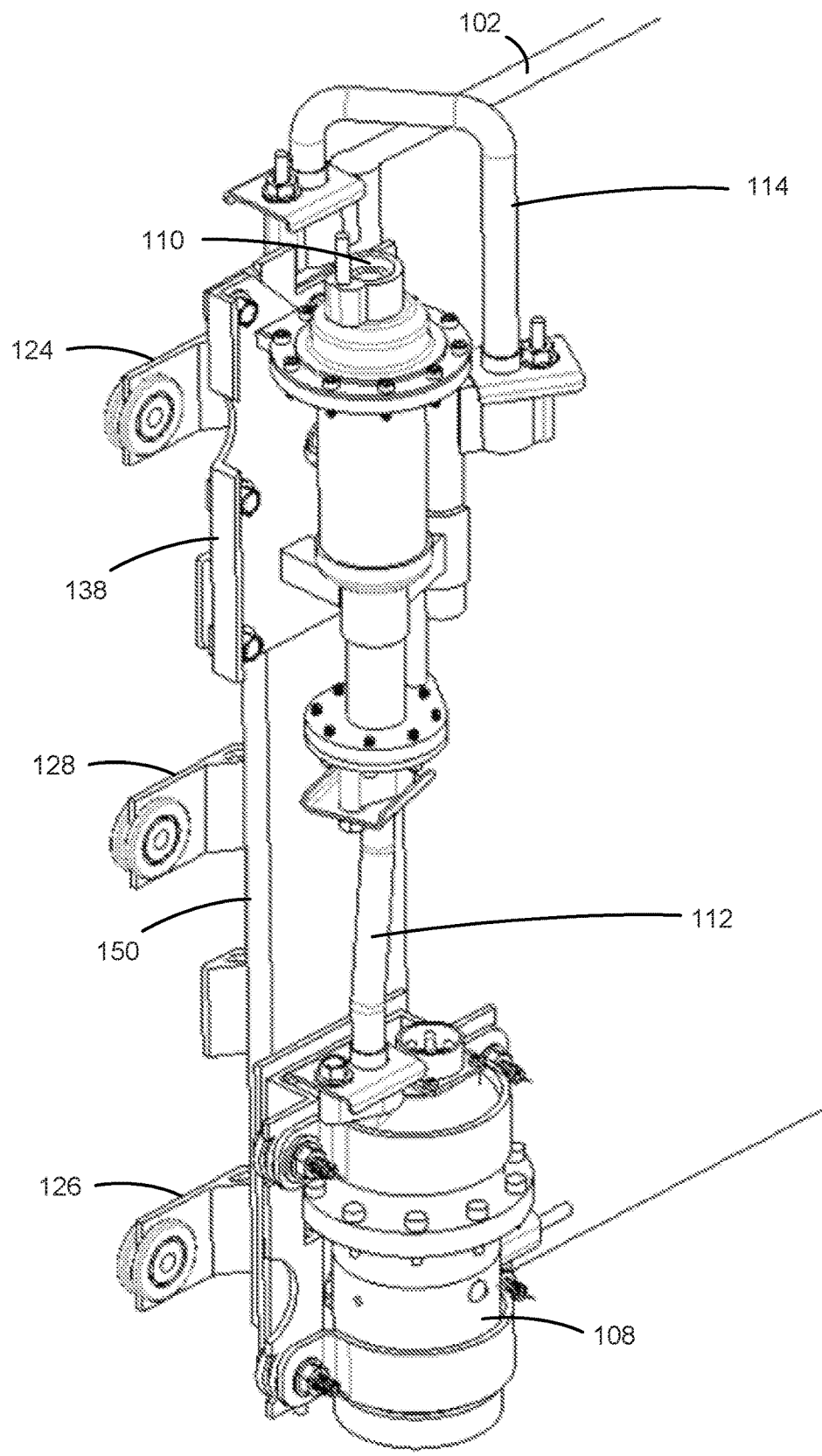
FIGS. 10A-10E are assembled side perspective view, assembled top-front perspective view, assembled back perspective view, front view and back view, illustrating an integrated system comprising a second exemplary mounting assembly in accordance with some embodiments of the present invention.
Figure 10B:
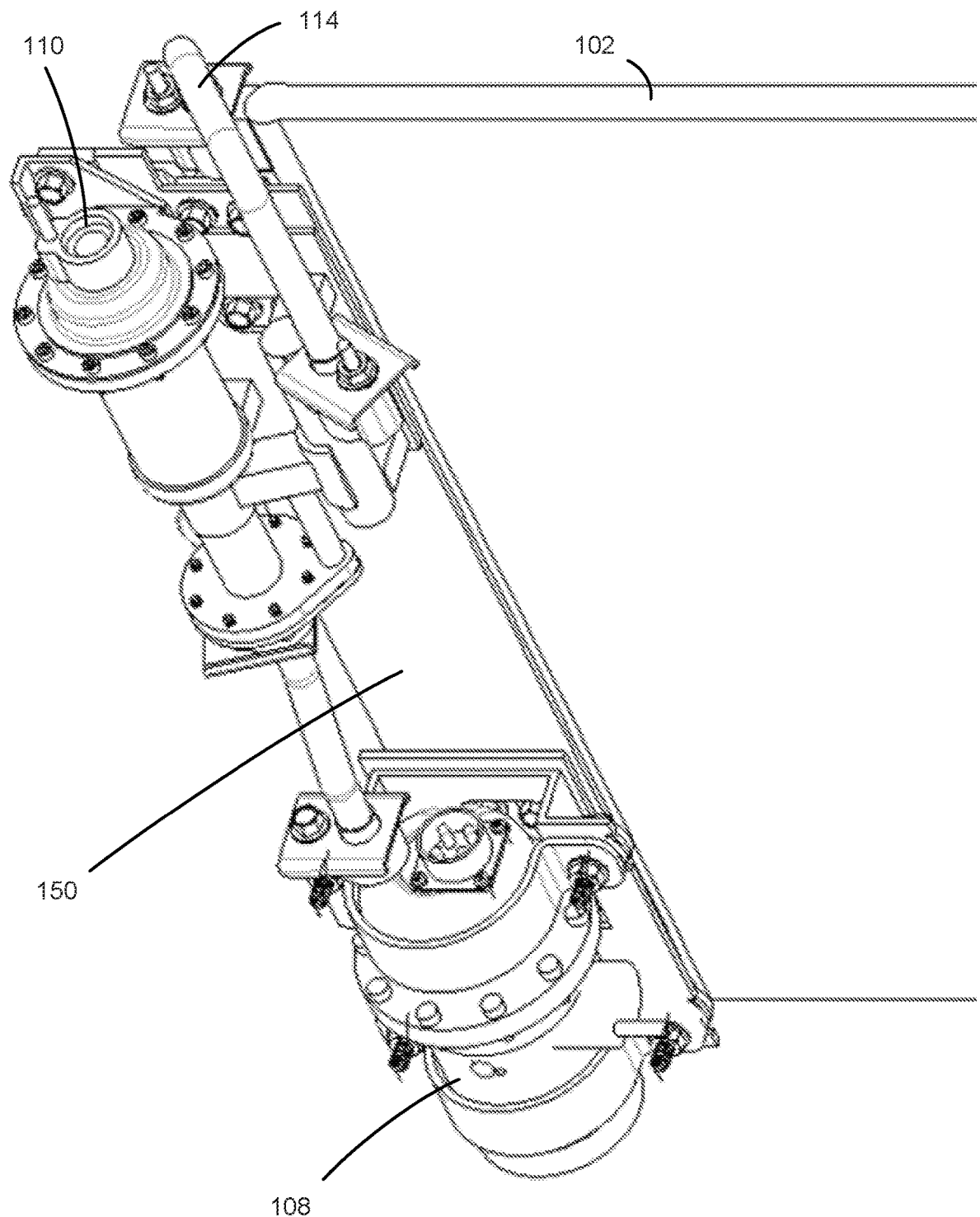
Figure 10C:
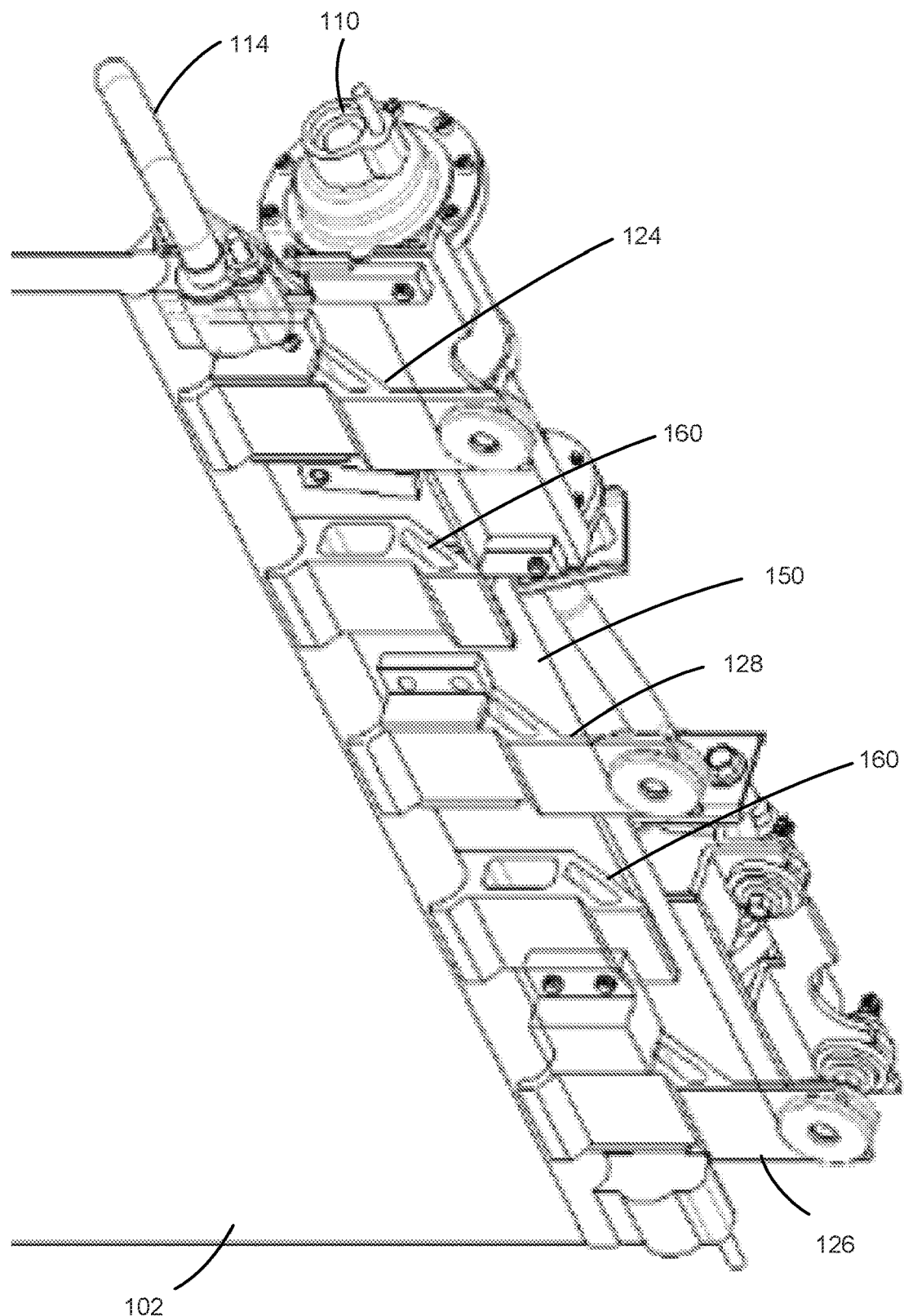
Figure 10D:
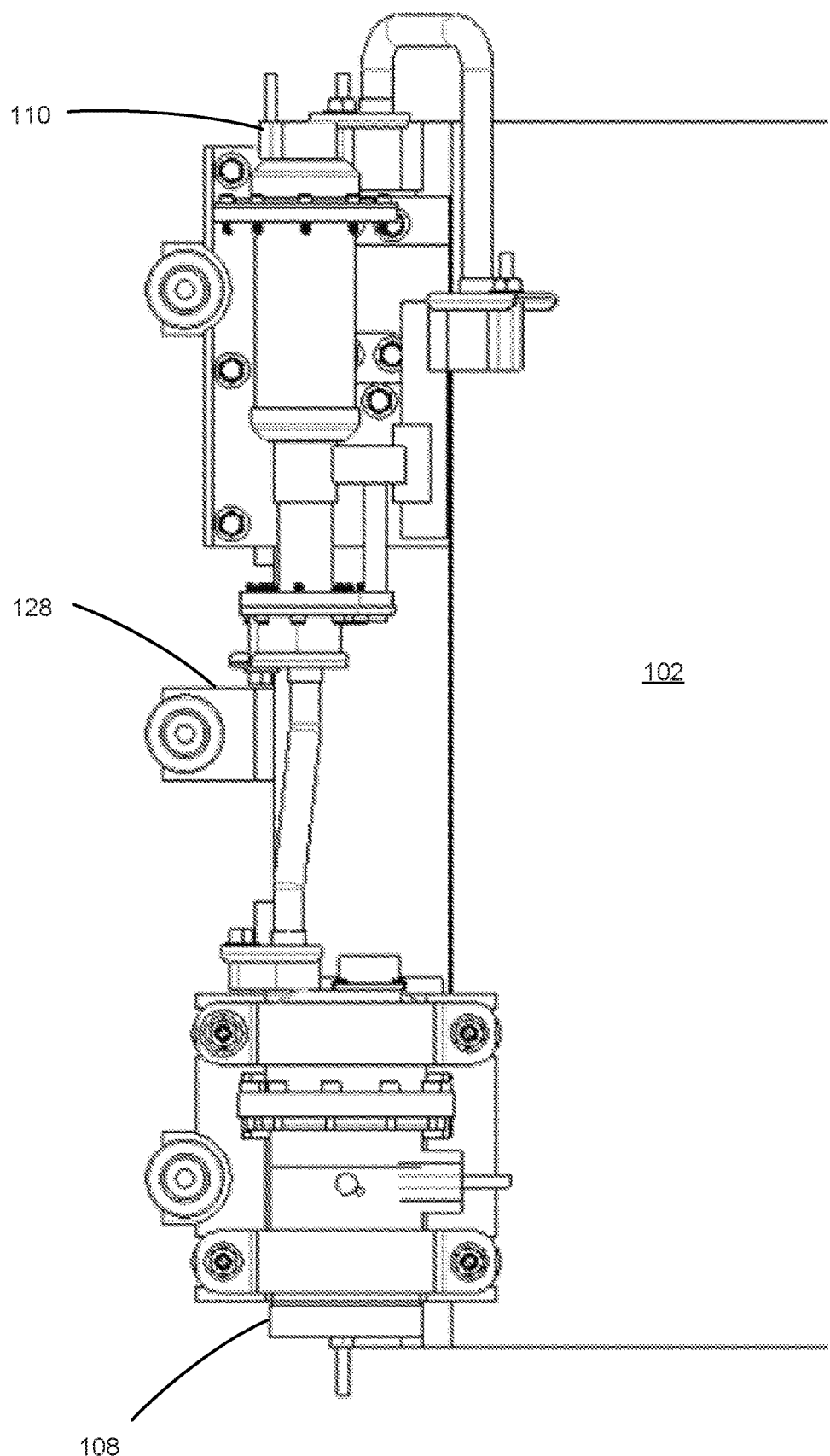
Figure 10E:
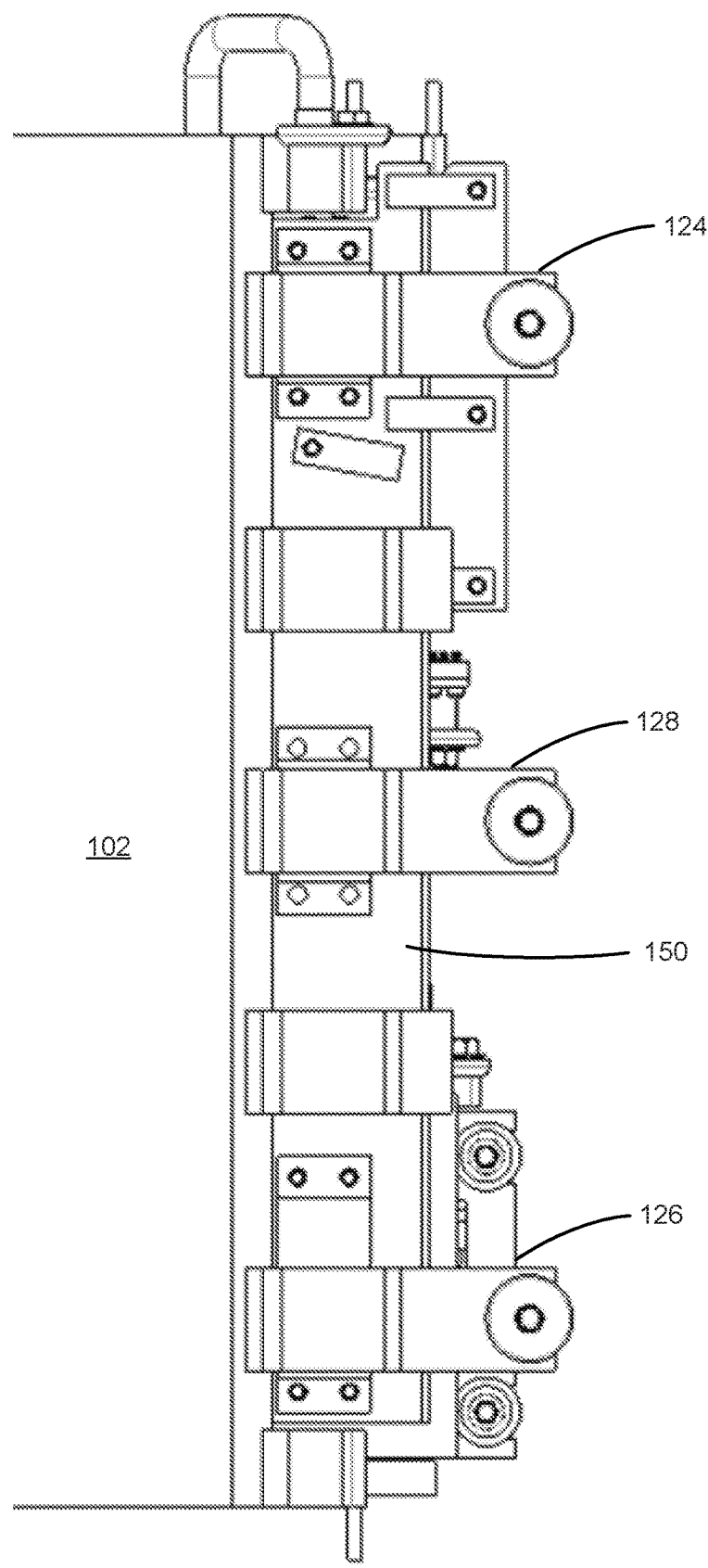

Generally, as illustrated in FIGS. 7B and 10A, the mounting assembly 106 is configured to be coupled with the condenser 102, the valve 110, and the first compressor 108. In many cases, the mounting assembly 106 includes one or more mounting brackets, a valve mounting assembly 130 and a compressor mounting assembly 132. Preferably, the one or more mounting brackets are configured to be coupled directly and fixedly to the condenser 102. The valve mounting assembly 130 is configured to hold the valve, and the compressor mounting assembly 132 is configured to hold the first compressor 108. The mounting assembly or some components of the mounting assembly can be pre-assembled (e.g., by O-ring type sealing, brazing, welding, mechanical fastening such as clamping, bolting, riveting, hinging) or integrally made (e.g., by casting or molding). Each individual component of the mounting assembly can also be made separately and assembled on site when coupling the system to an existing AC system.

Figure 7C:
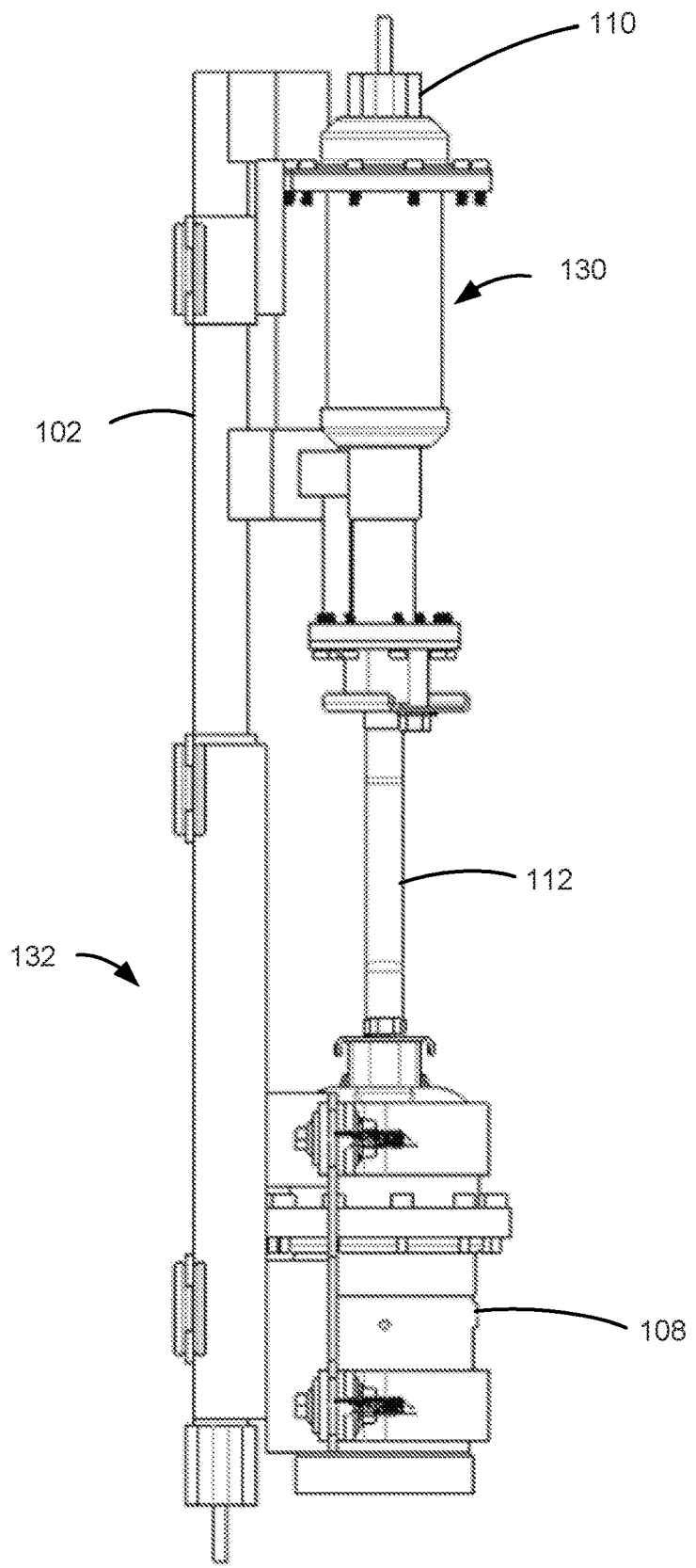
Figure 8A:
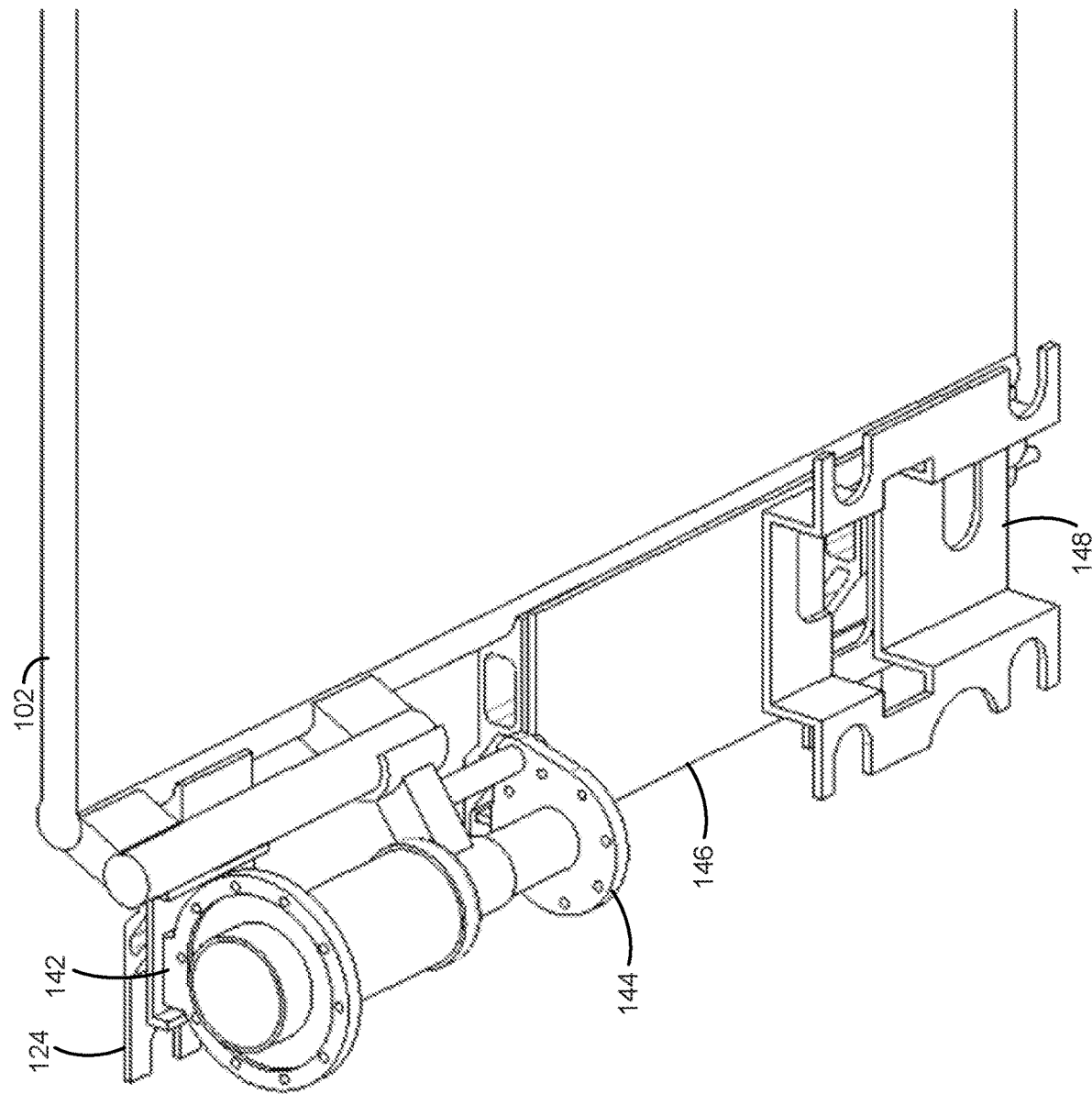
Figure 8B:
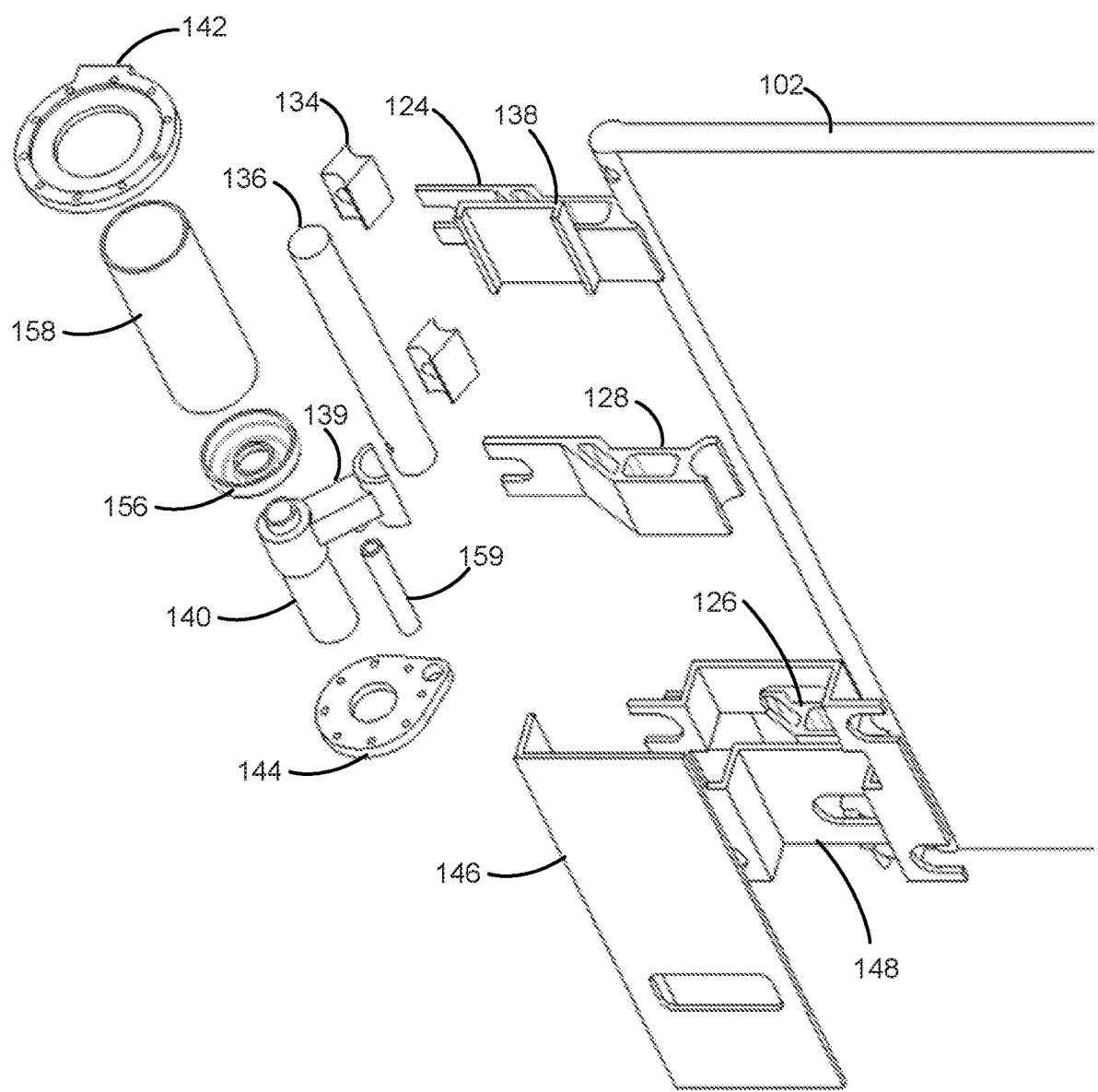
Figure 8C:
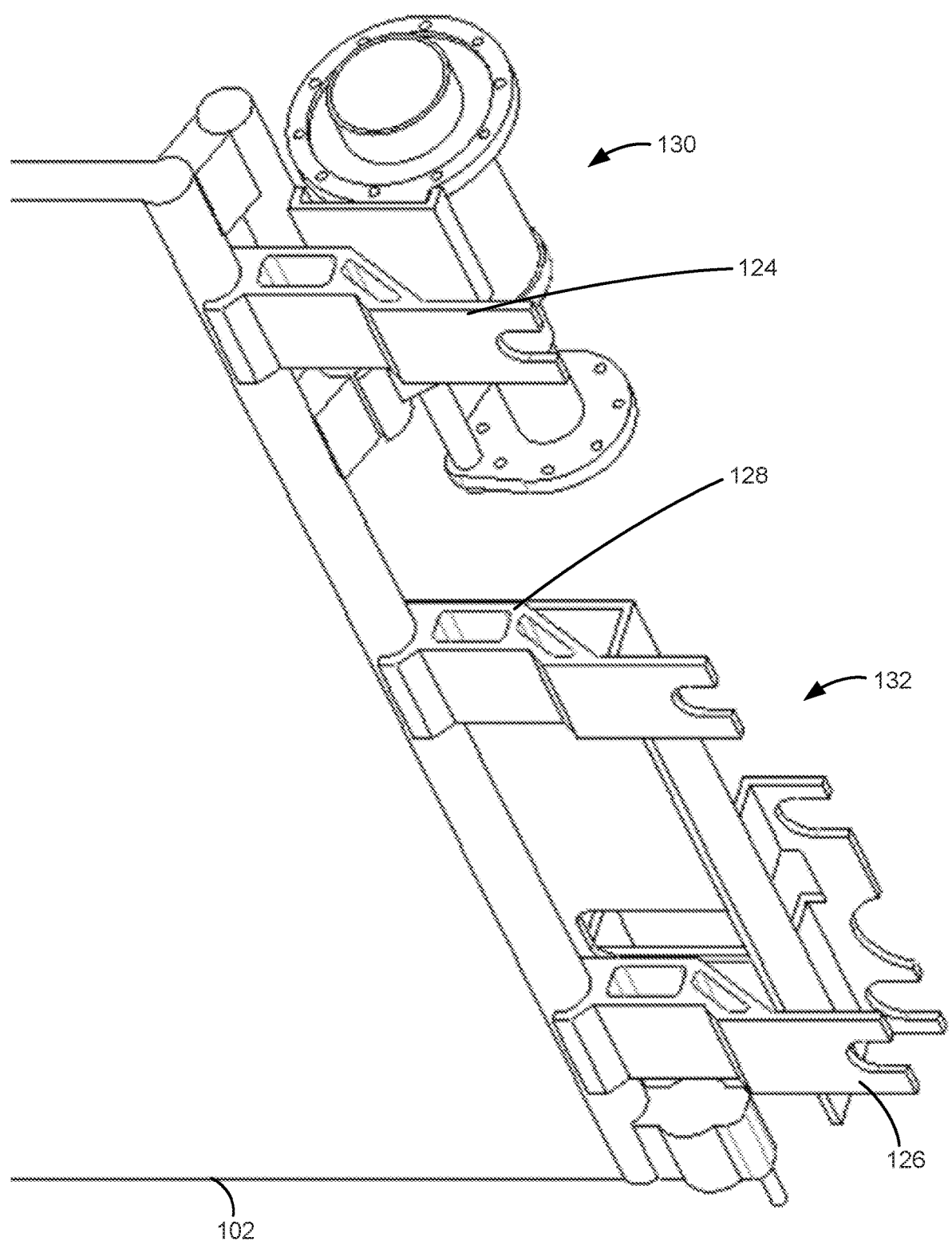
Figure 9:
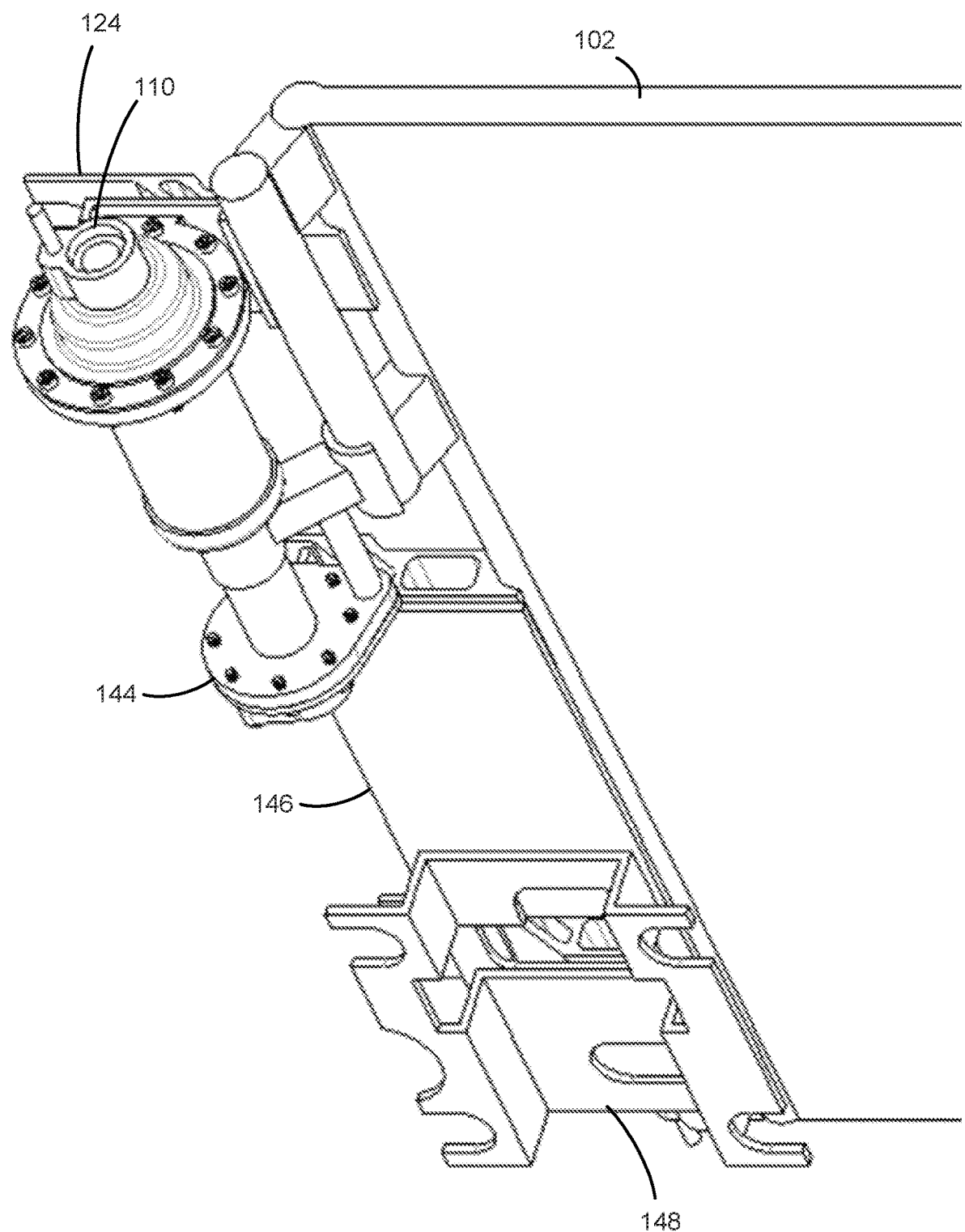
FIG. 9 illustrates a valve mounted on the first exemplary mounting assembly in accordance with some embodiments of the present invention.

For example, FIGS. 7-9 illustrate an integrated system of the present invention that includes a first exemplary mounting assembly, in which some components of the first exemplary mounting assembly are pre-assembled. As shown, the first exemplary mounting assembly comprises one or more mounting brackets, a valve mounting assembly 130 and a compressor mounting assembly 132. In some embodiments where the condenser 102 comprises an upper mounting bracket 124 and a lower mounting bracket 126, the one or more mounting brackets comprise a middle mounting bracket 128 directly and fixedly coupled to the condenser 102. Preferably, the middle mounting bracket 128 is configured to be substantially the same as the upper and lower mounting brackets of the condenser 102 and to be disposed between the upper and lower mounting brackets of the condenser 102. In the illustrated embodiments, the middle mounting bracket 128 is directly and fixedly coupled to an edge of the condenser 102 and extruded from the edge of the condenser 102. In particular, the middle mounting bracket 128 is directly and fixedly coupled to a middle portion of the edge of the condenser 102 between the upper mounting bracket 124 and the lower mounting bracket 126 of the condenser 102. In some embodiments, in addition to the middle mounting bracket 128, the mounting assembly comprises additional or optional mounting brackets.

In some embodiments where the condenser 102 does not comprise an upper mounting bracket or a lower mounting bracket, or where the condenser 102 is a component of the system of the present invention, the mounting assembly comprises a plurality of mounting brackets directly and fixedly coupled to the condenser 102, for example, to an edge of the condenser 102 and extruded from the edge of the condenser 102 as shown in the figures. In some embodiments, the plurality of mounting brackets comprises an upper mounting bracket 124, a middle mounting bracket 128 and a lower mounting bracket 126. Preferably, the upper mounting bracket is directly and fixedly coupled to an upper portion of the edge of the condenser 102. The middle mounting bracket 128 is directly and fixedly coupled to a middle portion of the edge of the condenser 102. The lower mounting bracket 126 is directly and fixedly coupled to a lower portion of the edge of the condenser 102.

The valve mounting assembly 130 is configured to hold the valve. Preferably, the valve mounting assembly 130 is directly and fixedly coupled to the edge of the condenser 102 or the upper mounting bracket, or coupled to both of the edge of the condenser 102 and the upper mounting bracket.

In some embodiments, the valve mounting assembly 130 is configured to comprise one or more or all of the following: (i) a plurality of spacers 134 directly and fixedly coupled to the edge of the condenser 102; (ii) a manifold 136 directly and fixedly coupled to one or more of the spacers 134; (iii) a first bracket 138 directly and fixedly coupled to the upper mounting bracket 124, at least one spacer, or both the upper mounting bracket 124 and at least one spacer; (iv) a plurality of machined rings configured to increase the strength of the valve mounting assembly 130 and to facilitate positioning and sealing of the valve, wherein the plurality of machined rings includes a first ring 142 directly and fixedly coupled to the first bracket 138 and a second ring 144; (v) a plurality of cylindrical pipes comprising one or more of the following: a first cylindrical pipe 158 fixedly coupled to the first ring 142, a second cylindrical pipe 140 fixedly coupled to the second ring 144, and a third cylindrical pipe or rod 159; (vi) a stamped PC 156 disposed blow the first cylindrical pipe 158; and (vii) a junction PC 139 directly and fixedly coupled to one or more of the following: the second cylindrical pipe 140, the third cylindrical pipe or rod 159, the first bracket 139, and one or more of the plurality of the spacers. Sizes, shapes, positions, and interconnections of these components are configured in accordance with the valve, the condenser, or the available space, and can be varied as required by the specific vehicle and HVAC system constraints. In some embodiments, some of these components are welded together or formed as a single casting. In some embodiments, all of these components are welded together or formed as a single casting.

In some embodiments, the valve mounting assembly 130 comprises additional or optional components, such as fasteners, spacers, seals, washers, structural supports or the like, to enhance the strength of the valve mounting assembly 130, to allow alternative arrangement of the valve mounting assembly 130 or the like.

The compressor mounting assembly 132 is configured to hold the first compressor 108. In a preferred embodiment, the compressor mounting assembly 132 is directly and fixedly coupled to one or more of the following: the condenser 102 such as an edge of the condenser, the middle mounting bracket 128, and the lower mounting bracket 126. In some embodiments, the compressor mounting assembly 132 comprises one or more of the following: (i) a second bracket 146 directly and fixedly coupled to one or more of the condenser 102 such as an edge of the condenser, the middle mounting bracket 128 and the lower mounting bracket 126; (ii) a U-shaped bracket 148 directly and fixedly coupled to the second bracket 146 and configured to accommodate the compressor; and (iii) a mechanism for reducing vibration. In some embodiments, the second bracket 146 is a L-shaped bracket. Like the valve assembly, in some cases, the second bracket 146 is pre-assembled (e.g. welded) to the middle mounting bracket 128 or the lower mounting bracket 126 or both. In some embodiments, the U-shaped bracket 148 is pre-assembled (e.g. welded) to the second bracket 146.

The U-shaped bracket 148, including its shape, size and material of which it is made, is configured or selected in accordance with the first compressor 108. In some embodiments, it is made an extrusion process and then cut and formed to shape. In some embodiments, the U-shaped bracket 148 is made with holes, cuts, slots, or the like, for coupling with the one or more mounting brackets 122 welded onto the wall of the first compressor. In such embodiments, the mechanism for reducing vibration comprises a plurality of rubber vibration mounts 154 that couple the one or more mounting brackets welded onto the wall of the first compressor to the U-shaped bracket 148 of the compressor mounting assembly 132.

FIGS. 10-13 illustrate an integrated system of the present invention including a second exemplary mounting assembly, in which all or most of the components of the second exemplary mounting assembly are separate and not pre-assembled (e.g., not welded together). As shown, the second exemplary mounting assembly comprises one or more mounting brackets, a third bracket 150, a valve mounting assembly 130 and a compressor mounting assembly 132. Like the one or more mounting brackets of the first exemplary mounting assembly, in some embodiments where the condenser 102 comprises an upper mounting bracket 124 and a lower mounting bracket 126, the one or more mounting brackets of the second exemplary mounting assembly comprise a middle mounting bracket 128 directly and fixedly coupled to the condenser 102. In some embodiments, in addition to the middle mounting bracket 128, the second exemplary mounting assembly comprises additional or optional mounting brackets to enhance the strength or assist in fixation of the mounting assembly on the condenser 102. The additional or optional mounting brackets can be configured substantially the same as or different from the middle mounting bracket 128. By way of illustration, FIGS. 10C and 11B illustrate two additional or optional mounting brackets 160 slightly different from the middle mounting bracket 128.

Similar to the first exemplary mounting assembly, in some embodiments where the condenser 102 does not comprise an upper mounting bracket 124 or a lower mounting bracket 126, or where the condenser 102 is a component of the system of the present invention, the second exemplary mounting assembly comprises a plurality of mounting brackets directly and fixedly coupled to the condenser 102. In some embodiments, the plurality of mounting brackets comprises an upper mounting bracket 124, a middle mounting bracket 128 and a lower mounting bracket 126.

Unlike the first exemplary mounting assembly, the second exemplary mounting assembly comprises a third bracket 150. Preferably, the third bracket 150 is relatively long and fixedly coupled to the upper, middle and lower mounting brackets. In some embodiments, the third bracket 150 is a L-shaped bracket or a plate bent at one edge. In some embodiments where the mounting assembly comprises additional or optional mounting brackets, the third bracket 150 is, preferably, fixedly coupled to the additional or optional mounting brackets. The fixed coupling can be achieved by any suitable meanings, including but not limited to welding, spot welding, clamping, bolting, riveting, hinging or by adhesives.

Preferably, the valve mounting assembly 130 of the second exemplary mounting assembly is directly and fixedly coupled to the edge of the condenser 102, an upper portion of the third bracket 150, or both. Similar to the valve mounting assembly of the first exemplary mounting assembly, the valve mounting assembly of the second exemplary mounting assembly can comprise a variety of components such as brackets, spacers or rings. For example, in some embodiments, the valve mounting assembly of the second exemplary mounting assembly is configured to comprise one or more or all of the following: (i) a plurality of spacers 134 directly and fixedly coupled to the edge of the condenser 102; (ii) a manifold 136 directly and fixedly coupled to one or more of the spacers 134; (iii) a first bracket 138 directly and fixedly coupled to the upper portion of the third bracket 150, at least one spacer, or both the upper portion of the third bracket 150 and at least one spacer; (iv) a plurality of machined rings configured to increase the strength of the valve mounting assembly and facilitate positioning and sealing of the valve, wherein the plurality of machined rings includes a first ring 142 directly and fixedly coupled to the first bracket 138 and a second ring 144; (v) a plurality of cylindrical pipes comprising one or more of the following: a first cylindrical pipe 158 fixedly coupled to the first ring 142, a second cylindrical pipe 140 fixedly coupled to the second ring 144, and a third cylindrical pipe or rod 159; (vi) a stamped PC 156 disposed blow the first cylindrical pipe 158; and (vii) a junction PC 139 directly and fixedly coupled to one or more of the following: the second cylindrical pipe 140, the third cylindrical pipe or rod 159, the first bracket 139, and one or more of the plurality of the spacers. Sizes, shapes, positions, interconnections of these components are configured in accordance with the valve, the condenser, or the available space and can be readily varied. In some embodiments, the valve mounting assembly of the second exemplary mounting assembly comprises additional or optional components, such as fasteners, spacers, seals, washers, structural supports or the like, to enhance the strength of the valve mounting assembly, to allow alternative arrangement of the valve mounting assembly or the like.

In the second exemplary mounting assembly, the compressor mounting assembly is, preferably, fixedly coupled to a lower portion of the third bracket 150. In some embodiments, the compressor mounting assembly comprises a U-shaped bracket 148 fixedly coupled to the lower portion of the third bracket 150 and configured to accommodate the compressor, a mechanism for reducing vibration, or both. In some embodiments, the compressor mounting assembly further comprises a plate or pad 152 disposed between the U-shaped bracket 148 and the third bracket 150. The plate or pad 152 is configured to provide one or more of the following: reducing vibration, distributing pressure evenly and preventing the coupling of the U-shaped bracket 148 to the third bracket 150 from loosening.

FIG. 14 is a schematic diagram illustrating integration of the integrated system of the present invention with an existing AC system in accordance with some embodiments. As shown, the second valve inlet of the valve 110 is fluidly coupled to a compressor outlet of a second compressor 116, such as a compressor of an existing AC system used in a vehicle. The valve outlet of the valve 110 is fluidly connected to a condenser inlet of the condenser 102. In the illustrated embodiment, the compressor inlet of the first compressor 108 is fluidly connected to the compressor inlet of the second compressor 116, i.e., the first and second compressors are fluidly connected in parallel.

In some embodiments, the integrated system of the present invention further comprising a controller 118, such as the controller disclosed in U.S. patent application Ser. No. 14/995,119, the entire contents of which are incorporated herein for all purposes by this reference. The controller 118 is electrically coupled to the first and second compressors and configured to selectively control the operation of the first and second compressors. For example, when the cooling demand is below the cooling capacity of the exciting AC system, the control turns off the second compressor (the compressor of the exciting AC system) and turns on the first compressor, resulting in reduction in energy consumption and operation cost. As another example, the controller can be operated or programmed to turn on the first compressor to pre-condition the vehicle before a driver or passenger enters the vehicle. As a further example in which the existing AC system including multiple evaporators (e.g., a cab evaporator associated with the cab compartment and a sleeper evaporator associated with the sleeper compartment), the controller can selectively control the operation of the first and second compressors in accordance with the cooling demand in different compartments.

In some embodiments, the system of the present invention comprises other additional or optional components. For example, in an embodiment, the system of the present invention includes an electric fan 120. The fan is to be disposed adjacent to the condenser 102 to blow air over the condenser 102.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "lower" or "upper", "downward" or "upward", and etc. are used to describe features of the exemplary embodiments with reference to the positions of such features as displayed in the figures. It will also be understood that, although the terms "first," "second," etc. may be used herein to describe various elements, these elements should not be limited by these terms. These terms are only used to distinguish one element from another. For example, a first bracket 138 could be termed a second bracket, and, similarly, a second bracket could be termed a first bracket 138, without changing the meaning of the description, so long as all occurrences of the "first bracket 138" are renamed consistently and all occurrences of the "second bracket" are renamed consistently.

What is claimed is:

1. An aftermarket compressor system for coupling to an existing vehicle air-conditioning system, comprising:
   an electric compressor configured to mount directly to a condenser of the existing vehicle air-conditioning system via a first condenser bracket and compress a refrigerant, the electric compressor comprising a compressor inlet and a compressor outlet; and
   a valve configured to mount directly to the condenser of the existing vehicle air-conditioning system via a second condenser bracket, the valve comprising:
      a first valve inlet fluidly coupled to the compressor outlet of the electric compressor;
      a second valve inlet configured to be fluidly coupled to a compressor outlet of an engine-driven compressor of the existing vehicle air-conditioning system; and
      a valve outlet to be fluidly connected to a condenser inlet of the condenser.

2. The system of claim 1, wherein the compressor inlet of the electric compressor is configured to be fluidly connected to a compressor inlet of the engine-driven compressor.

3. The system of claim 1, wherein a largest cross-sectional dimension of the electric compressor is less than 3.5 inches, less than 4 inches, less than 4.5 inches or less than 5 inches.

4. The system of claim 1, wherein the electric compressor comprises one or more mounting brackets welded onto a wall of the electric compressor and configured to be coupled to the condenser.

5. The system of claim 1, wherein the valve is selected from the group consisting of a magnetic valve, a spring-load valve, electronic solenoid valve, and electronic stepper valve.

6. The system of claim 1, wherein the electric compressor comprises the first condenser bracket.

7. The system of claim 1, wherein the electric compressor comprises the second condenser bracket.

8. A system, comprising:
- an engine-driven compressor, of an existing vehicle air-conditioning system, configured to compress a refrigerant, the engine-driven compressor comprising a compressor outlet;
- a condenser having a condenser inlet;
- an electric compressor configured to compress a refrigerant, the electric compressor mounted directly to the condenser via a first condenser bracket and comprising a compressor inlet and a compressor outlet; and
- a valve mounted directly to the condenser via a second condenser bracket, the valve comprising:
  - a first valve inlet fluidly connected to the compressor outlet of the electric compressor;
  - a second valve inlet fluidly connected to the compressor outlet of the engine-driven compressor; and
  - a valve outlet fluidly connected to the condenser inlet of the condenser.

9. The system of claim 8, further comprising one or more of the following:
- a first refrigerant tube connecting the compressor outlet of the electric compressor to the first valve inlet of the valve;
- a second refrigerant tube for connecting the valve outlet of the valve to the condenser inlet of the condenser;
- a controller electrically coupled to the electric compressor and the engine-driven compressor and configured to selectively control operation of the electric compressor and the engine-driven compressor; and
- an electric fan disposed adjacent to the condenser, the electric fan being configured and positioned to blow air over the condenser.

10. The system of claim 8, further comprising:
- a valve mounting assembly configured to hold the valve, wherein the valve mounting assembly is directly and fixedly coupled to one or more of the following:
  - the edge of the condenser, and
  - the second condenser bracket; and
- a compressor mounting assembly configured to hold the electric compressor, wherein the compressor mounting assembly is directly and fixedly coupled to one or more of the following:
  - the edge of the condenser,
  - a middle mounting bracket, and
  - the first condenser bracket.

11. The system of claim 10, wherein the middle mounting bracket is identical to the first condenser bracket or the second condenser bracket.

12. The system of claim 10, wherein:
the valve mounting assembly comprises one or more of the following:
- a plurality of spacers directly and fixedly coupled to the edge of the condenser;
- a manifold directly and fixedly coupled to one or more of the spacers;
- a first bracket directly and fixedly coupled to one or more of the following: the second condenser bracket and one or more of the spacers;
- a plurality of machined rings configured to enhance strength of the valve mounting assembly and facilitate positioning and sealing of the valve, wherein the plurality of machined rings includes a first ring directly and fixedly coupled to the first bracket and a second ring;
- a plurality of cylindrical pipes comprising one or more of the following: a first cylindrical pipe fixedly coupled to the first ring, a second cylindrical pipe fixedly coupled to the second ring, and a third cylindrical pipe or rod;
- a stamped PC disposed below the first cylindrical pipe; and
- a junction PC directly and fixedly coupled to one or more of the following: the second cylindrical pipe, the third cylindrical pipe or rod, the first bracket, and one or more of the plurality of the spacers;

the compressor mounting assembly comprises one or more of the following:
- a second bracket directly and fixedly coupled to one or more of the following:
  - the edge of the condenser, the middle mounting bracket and the first condenser bracket;
- a U-shaped bracket directly and fixedly coupled to the second bracket, and configured to accommodate the electric compressor; and one or more vibration dampeners.

13. The system of claim 12, wherein:
the electric compressor comprises one or more mounting brackets welded onto a wall of the electric compressor and configured to be coupled to the U-shaped bracket of the compressor mounting assembly; and
the one or more vibration dampeners comprise a plurality of rubber vibration mounts coupling the one or more mounting brackets welded onto the wall of the electric compressor to the U-shaped bracket of the compressor mounting assembly.

14. The system of claim 8, wherein the condenser comprises the first condenser bracket and the second condenser bracket, and the system further comprises:
- a third bracket fixedly coupled to the first and second condenser brackets;
- a valve mounting assembly configured to hold the valve, wherein the valve mounting assembly is fixedly coupled to one or more of the following: the edge of the condenser and an upper portion of the third bracket; and
- a compressor mounting assembly configured to hold the electric compressor, wherein the compressor mounting assembly is fixedly coupled a lower portion of the third bracket.

15. The system of claim 14, wherein:
the valve mounting assembly comprises one or more of the following:
- a plurality of spacers directly and fixedly coupled to the edge of the condenser;
- a manifold directly and fixedly coupled to one or more of the spacers;
- a first bracket directly and fixedly coupled to one or more of the following: the upper portion of the third bracket and one or more of the spacers;
- a plurality of machined rings configured to enhance strength of the valve mounting assembly and facilitate positioning and sealing of the valve, wherein the plurality of machined rings includes a first ring directly and fixedly coupled to the first bracket and a second ring;

a plurality of cylindrical pipes comprising one or more of the following: a first cylindrical pipe fixedly coupled to the first ring, a second cylindrical pipe fixedly coupled to the second ring, and a third cylindrical pipe or rod;
a stamped PC disposed below the first cylindrical pipe; and
a junction PC directly and fixedly coupled to one or more of the following: the second cylindrical pipe, the third cylindrical pipe or rod, the first bracket, and one or more of the plurality of the spacers; and
the compressor mounting assembly comprises one or more of the following:
a U-shaped bracket fixedly coupled to the lower portion of the third bracket and configured to accommodate the electric compressor;
one or more vibration dampeners; and
a pad disposed between the U-shaped bracket and the third bracket and configured to provide one or more of the following: reducing vibration, distributing pressure evenly, and preventing the coupling of the U-shaped bracket to the third bracket from loosening.

16. The system of claim 8, further comprising a mounting assembly, wherein the mounting assembly comprises:
a plurality of mounting brackets directly and fixedly coupled to an edge of the condenser and extruded from the edge of the condenser, wherein the plurality of mounting brackets comprises:
(i) an upper mounting bracket directly and fixedly coupled to an upper portion of the edge of the condenser;
(ii) a middle mounting bracket directly and fixedly coupled to a middle portion of the edge of the condenser; and
(iii) a lower mounting bracket directly and fixedly coupled to a lower portion of the edge of the condenser;
a third bracket fixedly coupled to the upper, middle and lower mounting brackets;
a valve mounting assembly configured to hold the valve, wherein the valve mounting assembly is fixedly coupled to one or more of the following: the edge of the condenser, and an upper portion of the third bracket; and
a compressor mounting assembly configured to hold the electric compressor, wherein the compressor mounting assembly is fixedly coupled to a lower portion of the third bracket.

17. The system of claim 16, wherein:
the valve mounting assembly comprises one or more of the following:
a plurality of spacers directly and fixedly coupled to the edge of the condenser;
a manifold directly and fixedly coupled to one or more of the spacers;
a first bracket directly and fixedly coupled to one or more of the following: the upper portion of the third bracket and one or more of the spacers;
a plurality of machined rings configured to enhance strength of the valve mounting assembly and facilitate positioning and sealing of the valve, wherein the plurality of machined rings includes a first ring directly and fixedly coupled to the first bracket and a second ring;
a plurality of cylindrical pipes comprising one or more of the following: a first cylindrical pipe fixedly coupled to the first ring, a second cylindrical pipe fixedly coupled to the second ring, and a third cylindrical pipe or rod;
a stamped PC disposed below the first cylindrical pipe; and
a junction PC directly and fixedly coupled to one or more of the following: the second cylindrical pipe, the third cylindrical pipe or rod, the first bracket, and one or more of the plurality of the spacers; and
the compressor mounting assembly comprises one or more of the following:
a U-shaped bracket fixedly coupled to the lower portion of the third bracket and configured to accommodate the electric compressor;
one or more vibration dampeners; and
a pad disposed between the U-shaped bracket and the third bracket and configured to provide one or more of the following: reducing vibration, distributing pressure evenly, and preventing the coupling of the U-shaped bracket to the third bracket from loosening.

18. The system of claim 17, wherein:
the electric compressor comprises one or more mounting brackets welded onto a wall of the electric compressor and configured to be coupled to the U-shaped bracket of the compressor mounting assembly; and
the one or more vibration dampeners comprise a plurality of rubber vibration mounts coupling the one or more mounting brackets welded onto the wall of the electric compressor to the U-shaped bracket of the compressor mounting assembly.

* * * * *

UNITED STATES PATENT AND TRADEMARK OFFICE
CERTIFICATE OF CORRECTION

PATENT NO. : 10,589,598 B2  
APPLICATION NO. : 15/065745  
DATED : March 17, 2020  
INVENTOR(S) : Connell et al.

Page 1 of 1

It is certified that error appears in the above-identified patent and that said Letters Patent is hereby corrected as shown below:

On the Title Page

(57) ABSTRACT, Line 9, please delete "When assembly and integrated" and insert --When assembled and integrated--;

(57) ABSTRACT, Lines 12-13, please delete "compressor of existing" and insert --compressor of the existing--;

In the Claims

Claim 14, Column 12, Line 50, please delete "coupled a" and insert --coupled to a--.

Signed and Sealed this  
Second Day of June, 2020

Andrei Iancu  
*Director of the United States Patent and Trademark Office*